US012612855B2

(12) United States Patent
Raina et al.

(10) Patent No.: US 12,612,855 B2
(45) Date of Patent: Apr. 28, 2026

(54) SYSTEM AND METHOD FOR DETERMINING WELL CORRELATION

(71) Applicant: Schlumberger Technology Corporation, Sugar Land, TX (US)

(72) Inventors: Ishan Raina, Abu Dhabi (AE); Sylvain Wlodarczyk, Montpellier (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 401 days.

(21) Appl. No.: 18/254,918

(22) PCT Filed: Dec. 15, 2020

(86) PCT No.: PCT/US2020/065044
§ 371 (c)(1),
(2) Date: May 30, 2023

(87) PCT Pub. No.: WO2022/119581
PCT Pub. Date: Jun. 9, 2022

(65) Prior Publication Data
US 2024/0026776 A1      Jan. 25, 2024

Related U.S. Application Data

(60) Provisional application No. 63/199,022, filed on Dec. 2, 2020.

(51) Int. Cl.
*E21B 47/09* (2012.01)
*G01V 11/00* (2006.01)
*G06F 40/295* (2020.01)

(52) U.S. Cl.
CPC .............. *E21B 47/09* (2013.01); *G01V 11/00* (2013.01); *G06F 40/295* (2020.01); *E21B 2200/20* (2020.05); *G01V 2210/643* (2013.01)

(58) Field of Classification Search
CPC ...... E21B 47/09; E21B 2200/20; E21B 41/00; G01V 11/00; G01V 2210/643; G01V 1/50;
(Continued)

(56) References Cited

U.S. PATENT DOCUMENTS

| | | | | |
|---|---|---|---|---|
| 11,694,095 | B2 * | 7/2023 | Akkurt | G01V 5/10 |
| | | | | 706/12 |
| 2017/0075872 | A1 * | 3/2017 | Tong | E21B 47/00 |

(Continued)

FOREIGN PATENT DOCUMENTS

| | | | | | |
|---|---|---|---|---|---|
| WO | WO-2015042103 | A1 * | 3/2015 | ............. | G01V 99/00 |
| WO | WO-2019204555 | A1 * | 10/2019 | .............. | G01V 1/50 |
| WO | WO-2020139447 | A1 * | 7/2020 | ........... | G06F 40/242 |

OTHER PUBLICATIONS

WO-2015042103-A1_translated (Year: 2015).*
(Continued)

*Primary Examiner* — Catherine T. Rastovski
*Assistant Examiner* — Michael J Singletary
(74) *Attorney, Agent, or Firm* — Kyle R. Miiller

(57) ABSTRACT

A method includes determining a search window in a target well. The method also includes identifying one or more reference wells based at least partially upon a location of the target well. The method also includes predicting a plurality of locations of a target well marker in the target well based at least partially upon the one or more reference wells. The locations of the target well marker are within the search window. The method also includes determining similarity values for the locations of the target well marker. The method also includes assigning the target well marker to at least one of the locations based at least partially upon the similarity values.

19 Claims, 14 Drawing Sheets

(58) Field of Classification Search
CPC ............ G01V 2210/612; G06F 40/295; G06F
16/243; G06F 16/2452; G06F 16/29;
G06F 16/906; G06F 40/194; G06F
40/284; G06F 18/23; G06Q 50/02
See application file for complete search history.

(56) References Cited

U.S. PATENT DOCUMENTS

| | | | |
|---|---|---|---|
| 2017/0139078 A1* | 5/2017 | Knight .................... | G16B 10/00 |
| 2017/0351752 A1* | 12/2017 | Meehan .............. | G06F 16/2379 |
| 2020/0183042 A1* | 6/2020 | Amidi .................. | G06F 18/232 |

OTHER PUBLICATIONS

WO-2020139447-A1_translated (Year: 2020).*
WO-2019204555-A1_translated (Year: 2019).*

Ankerst, M. et al., "OPTICS: Ordering Points to Identify the Clustering Structure", proceedings of ACM SIGMOD 99 International Conference on Management of Data, Philadelphia, Pennsylvania, USA, 1999, 12 pages.
"Optics algorithm" downloaded from [https://en.wikipedia.org/wiki/OPTICS_algorithm] on Jun. 27, 2023, 3 pages.
"Kriging" downloaded from [a. https://en.wikipedia.org/wiki/Kriging] on Jun. 27, 2023, 5 pages.
"Dynamic time warping", downloaded from [https://en.wikipedia.org/wiki/Dynamic_time_warping] on Jun. 27, 2023, 4 pages.
"Levenshtein distance", downloaded from [https://en.wikipedia.org/wiki/Levenshtein_distance] on Jun. 27, 2023, 3 pages.
Search Report and Written Opinion of International Patent Application No. PCT/US2020/065044 dated Mar. 22, 2021, 15 pages.
International Preliminary Report on Patentability of International Patent Application No. PCT/US2020/065044 dated Jun. 15, 2023, 10 pages.

* cited by examiner

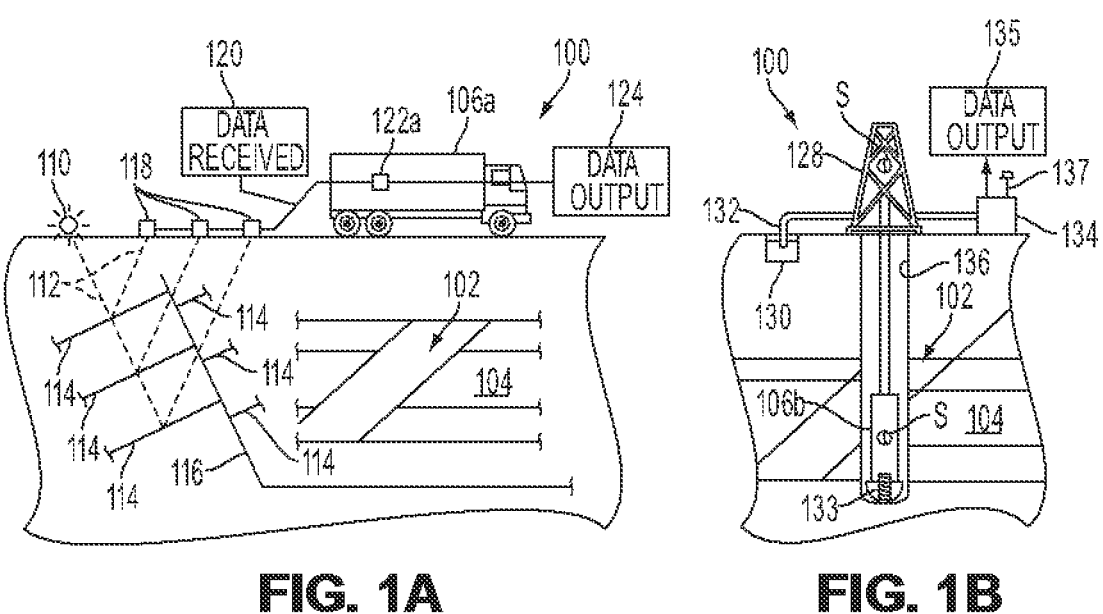
FIG. 1A
FIG. 1B
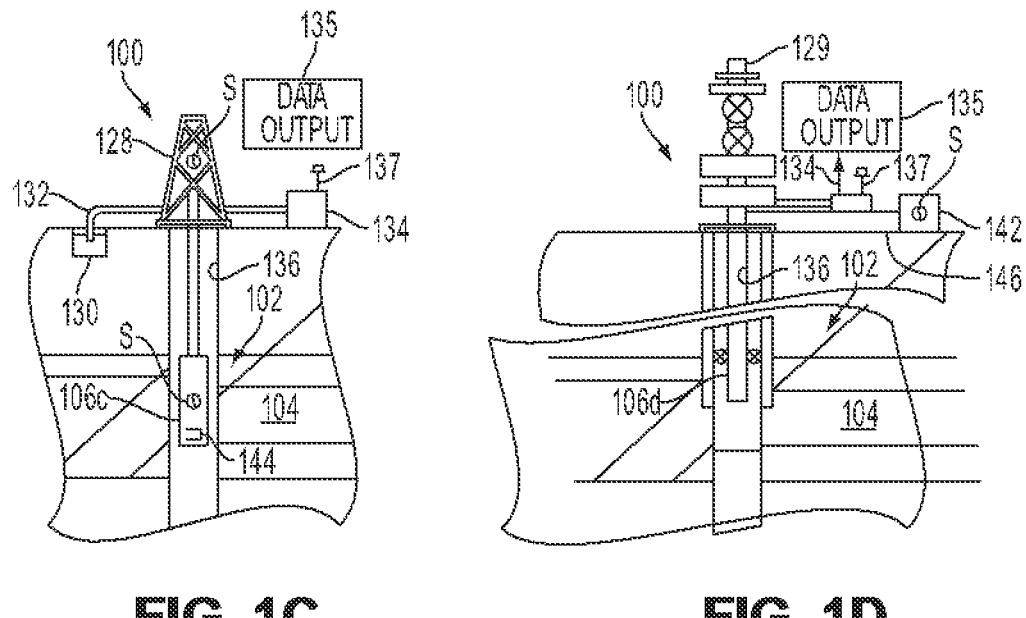
FIG. 1C
FIG. 1D

FIG. 6

Longitude

Latitude

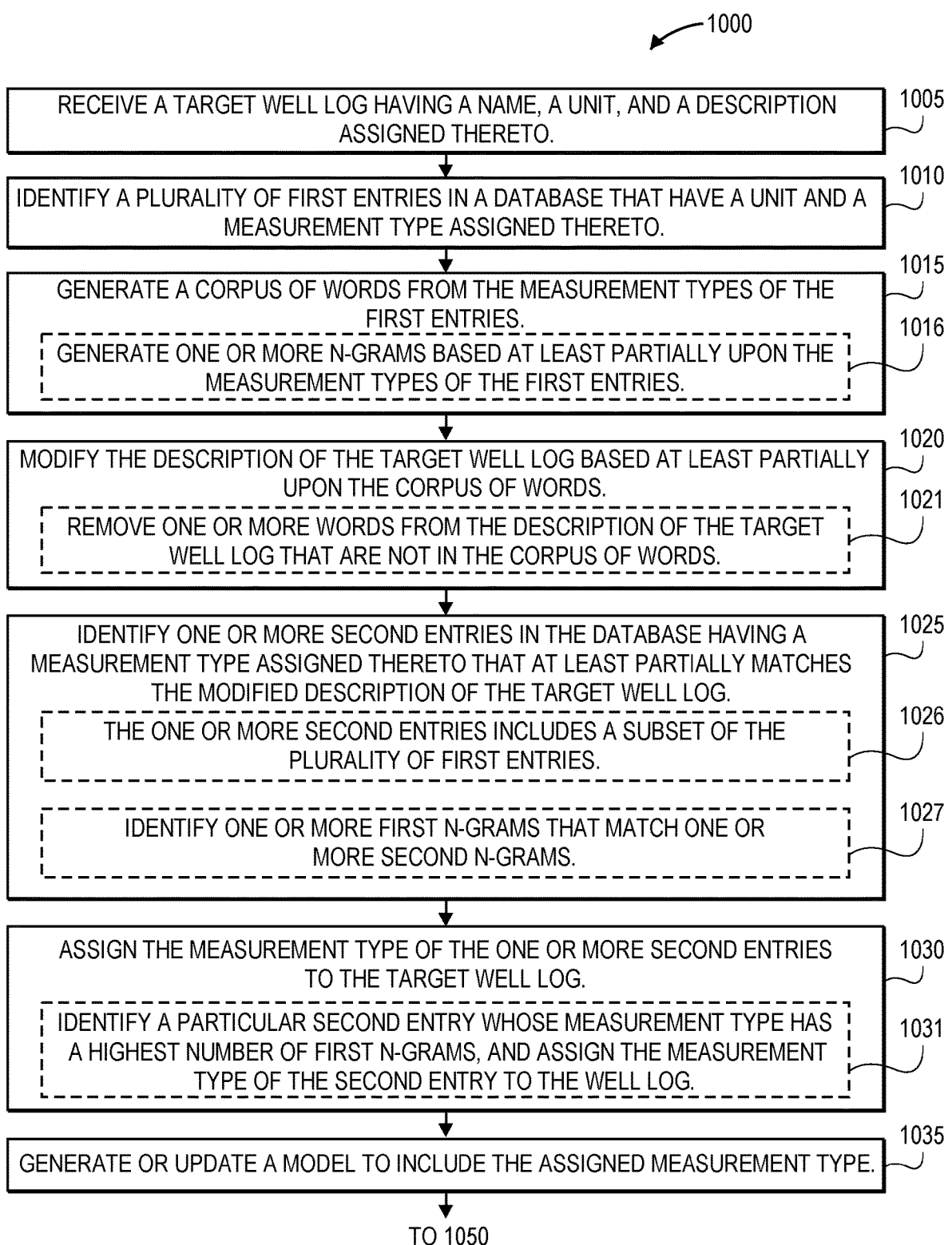

1000

RECEIVE A TARGET WELL LOG HAVING A NAME, A UNIT, AND A DESCRIPTION ASSIGNED THERETO.   1005

IDENTIFY A PLURALITY OF FIRST ENTRIES IN A DATABASE THAT HAVE A UNIT AND A MEASUREMENT TYPE ASSIGNED THERETO.   1010

GENERATE A CORPUS OF WORDS FROM THE MEASUREMENT TYPES OF THE FIRST ENTRIES.   1015
GENERATE ONE OR MORE N-GRAMS BASED AT LEAST PARTIALLY UPON THE MEASUREMENT TYPES OF THE FIRST ENTRIES.   1016

MODIFY THE DESCRIPTION OF THE TARGET WELL LOG BASED AT LEAST PARTIALLY UPON THE CORPUS OF WORDS.   1020
REMOVE ONE OR MORE WORDS FROM THE DESCRIPTION OF THE TARGET WELL LOG THAT ARE NOT IN THE CORPUS OF WORDS.   1021

IDENTIFY ONE OR MORE SECOND ENTRIES IN THE DATABASE HAVING A MEASUREMENT TYPE ASSIGNED THERETO THAT AT LEAST PARTIALLY MATCHES THE MODIFIED DESCRIPTION OF THE TARGET WELL LOG.   1025
THE ONE OR MORE SECOND ENTRIES INCLUDES A SUBSET OF THE PLURALITY OF FIRST ENTRIES.   1026
IDENTIFY ONE OR MORE FIRST N-GRAMS THAT MATCH ONE OR MORE SECOND N-GRAMS.   1027

ASSIGN THE MEASUREMENT TYPE OF THE ONE OR MORE SECOND ENTRIES TO THE TARGET WELL LOG.   1030
IDENTIFY A PARTICULAR SECOND ENTRY WHOSE MEASUREMENT TYPE HAS A HIGHEST NUMBER OF FIRST N-GRAMS, AND ASSIGN THE MEASUREMENT TYPE OF THE SECOND ENTRY TO THE WELL LOG.   1031

GENERATE OR UPDATE A MODEL TO INCLUDE THE ASSIGNED MEASUREMENT TYPE.   1035

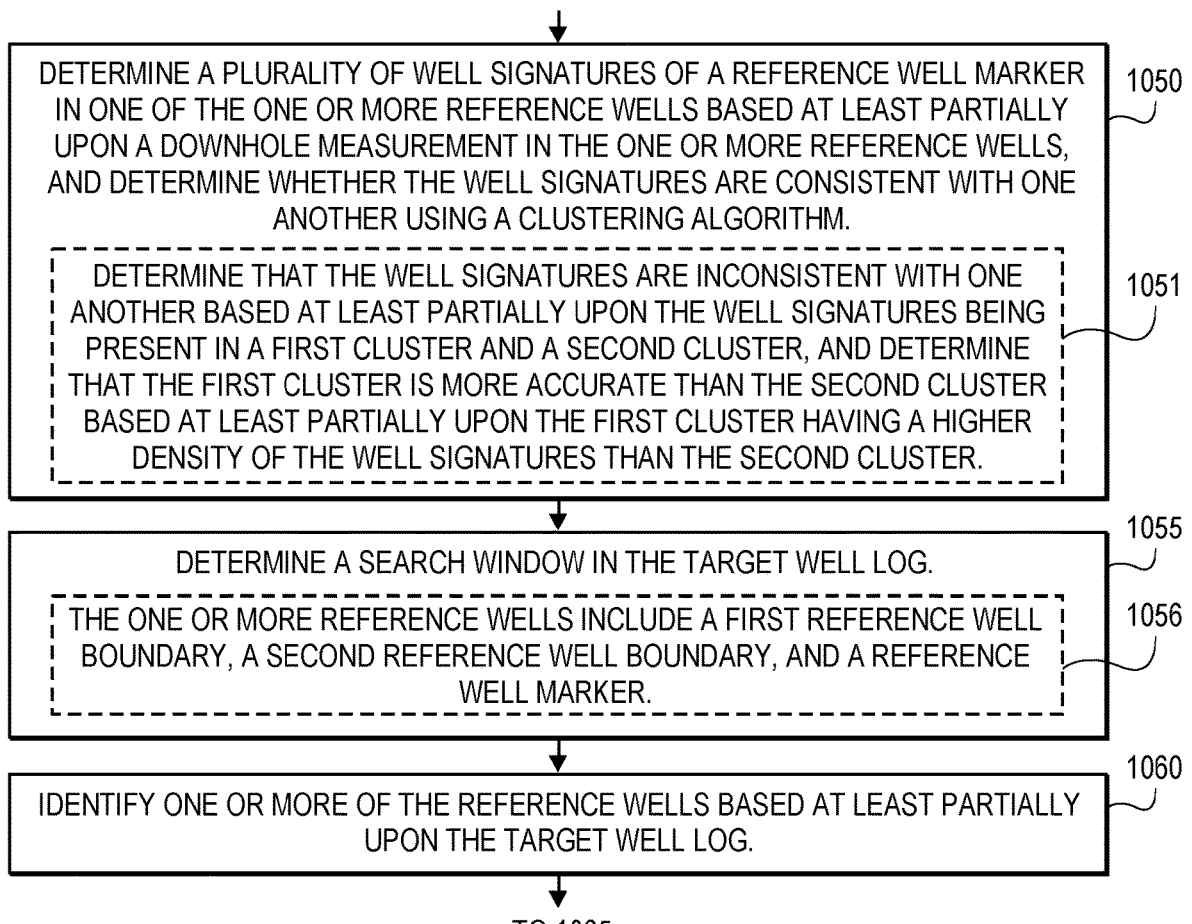

FROM 1035

DETERMINE A PLURALITY OF WELL SIGNATURES OF A REFERENCE WELL MARKER IN ONE OF THE ONE OR MORE REFERENCE WELLS BASED AT LEAST PARTIALLY UPON A DOWNHOLE MEASUREMENT IN THE ONE OR MORE REFERENCE WELLS, AND DETERMINE WHETHER THE WELL SIGNATURES ARE CONSISTENT WITH ONE ANOTHER USING A CLUSTERING ALGORITHM.          1050

DETERMINE THAT THE WELL SIGNATURES ARE INCONSISTENT WITH ONE ANOTHER BASED AT LEAST PARTIALLY UPON THE WELL SIGNATURES BEING PRESENT IN A FIRST CLUSTER AND A SECOND CLUSTER, AND DETERMINE THAT THE FIRST CLUSTER IS MORE ACCURATE THAN THE SECOND CLUSTER BASED AT LEAST PARTIALLY UPON THE FIRST CLUSTER HAVING A HIGHER DENSITY OF THE WELL SIGNATURES THAN THE SECOND CLUSTER.          1051

DETERMINE A SEARCH WINDOW IN THE TARGET WELL LOG.          1055

THE ONE OR MORE REFERENCE WELLS INCLUDE A FIRST REFERENCE WELL BOUNDARY, A SECOND REFERENCE WELL BOUNDARY, AND A REFERENCE WELL MARKER.          1056

IDENTIFY ONE OR MORE OF THE REFERENCE WELLS BASED AT LEAST PARTIALLY UPON THE TARGET WELL LOG.          1060

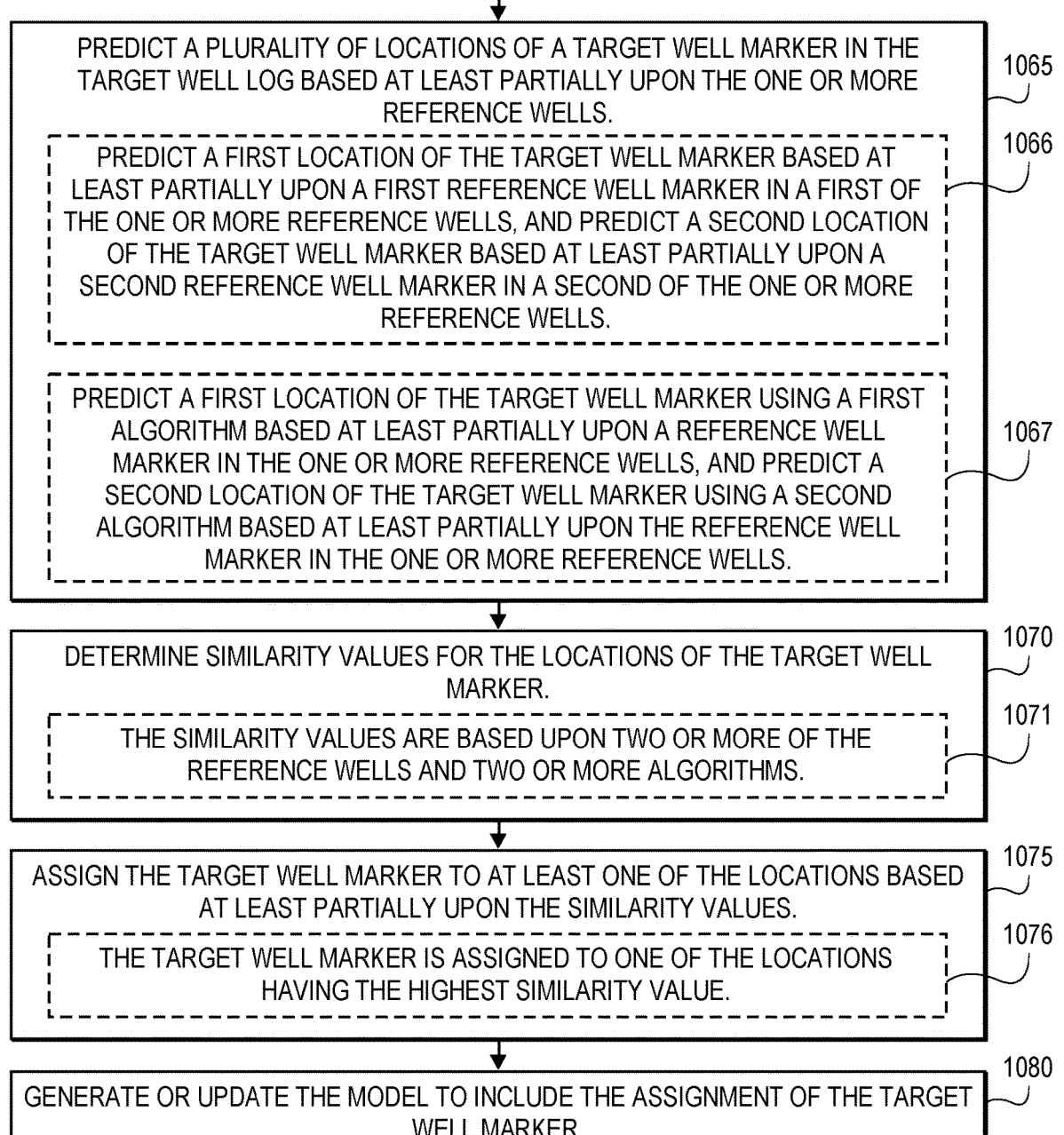

FROM 1060

PREDICT A PLURALITY OF LOCATIONS OF A TARGET WELL MARKER IN THE TARGET WELL LOG BASED AT LEAST PARTIALLY UPON THE ONE OR MORE REFERENCE WELLS.                    1065

PREDICT A FIRST LOCATION OF THE TARGET WELL MARKER BASED AT LEAST PARTIALLY UPON A FIRST REFERENCE WELL MARKER IN A FIRST OF THE ONE OR MORE REFERENCE WELLS, AND PREDICT A SECOND LOCATION OF THE TARGET WELL MARKER BASED AT LEAST PARTIALLY UPON A SECOND REFERENCE WELL MARKER IN A SECOND OF THE ONE OR MORE REFERENCE WELLS.                    1066

PREDICT A FIRST LOCATION OF THE TARGET WELL MARKER USING A FIRST ALGORITHM BASED AT LEAST PARTIALLY UPON A REFERENCE WELL MARKER IN THE ONE OR MORE REFERENCE WELLS, AND PREDICT A SECOND LOCATION OF THE TARGET WELL MARKER USING A SECOND ALGORITHM BASED AT LEAST PARTIALLY UPON THE REFERENCE WELL MARKER IN THE ONE OR MORE REFERENCE WELLS.                    1067

DETERMINE SIMILARITY VALUES FOR THE LOCATIONS OF THE TARGET WELL MARKER.                    1070

THE SIMILARITY VALUES ARE BASED UPON TWO OR MORE OF THE REFERENCE WELLS AND TWO OR MORE ALGORITHMS.                    1071

ASSIGN THE TARGET WELL MARKER TO AT LEAST ONE OF THE LOCATIONS BASED AT LEAST PARTIALLY UPON THE SIMILARITY VALUES.                    1075

THE TARGET WELL MARKER IS ASSIGNED TO ONE OF THE LOCATIONS HAVING THE HIGHEST SIMILARITY VALUE.                    1076

GENERATE OR UPDATE THE MODEL TO INCLUDE THE ASSIGNMENT OF THE TARGET WELL MARKER.                    1080

FIG. 10C

SYSTEM AND METHOD FOR DETERMINING WELL CORRELATION

CROSS REFERENCE PARAGRAPH

This application is a national stage entry under 35 U.S.C. § 371 of International Application No. PCT/US2020/065044, entitled "SYSTEM AND METHOD FOR DETERMINING WELL CORRELATION," filed Dec. 15, 2020, which claims the benefit of U.S. Provisional Application No. 63/199,022, entitled "SYSTEM AND METHOD FOR DETERMINING WELL CORRELATION," filed Dec. 2, 2020, the disclosure of which is hereby incorporated herein by reference.

BACKGROUND

The oil and gas industry measures formation and drilling properties along a drilled well. Those properties are then interpreted to assess oil and gas reserves in a subterranean formation.

In geology, the term well correlation refers to matching points of one well to another based on data suggesting that the strata at these points were deposited at the same geological time or otherwise have similar characteristics. To perform well correlation, a geologist uses wellbore data such as well logs and measurements of the subsurface properties along the well. The well logs may be considered as time series, and when there is a change in geological stratum, there is often a change in the time series. The boundary between two geological layers in a subterranean formation is called a marker. In practice, the geologist manually picks the markers on the logs using his/her expertise. As a result, the results may vary from geologist to geologist. The process is also time-consuming.

SUMMARY

Embodiments of the disclosure may include a method. The method includes receiving a target well log having a name, a unit, and a description assigned thereto. The method also includes identifying a plurality of first entries in a database that have a unit and a measurement type assigned thereto. The units of the first entries are compatible with the unit of the target well log. The method also includes generating a corpus of words from the measurement types of the first entries. The method also includes modifying the description of the target well log based at least partially upon the corpus of words. The method also includes identifying one or more second entries in the database having a measurement type assigned thereto that at least partially matches the modified description of the target well log. The method also includes assigning the measurement type of the one or more second entries to the target well log. The method also includes determining a search window in the target well log. The method also includes identifying one or more reference wells based at least partially upon the target well log. The method also includes predicting a plurality of locations of a target well marker in the target well log based at least partially upon the one or more reference wells. The locations of the target well marker are within the search window. The method also includes determining similarity values for the locations of the target well marker. The method also includes assigning the target well marker to at least one of the locations based at least partially upon the similarity values.

In an embodiment, the measurement type of the first entries includes one or more first n-grams. The modified description of the target well log includes one or more second n-grams. Identifying the one or more second entries includes identifying the one or more first n-grams that match the one or more second n-grams.

In an embodiment, predicting the locations of the target well marker includes predicting a first location of the target well marker based at least partially upon a first reference well marker in a first of the one or more reference wells, and predicting a second location of the target well marker based at least partially upon a second reference well marker in a second of the one or more reference wells.

In an embodiment, the method may also include generating or updating a model to include the assignment of the target well marker.

Embodiments of the disclosure may also include a method for assigning a target well marker. The method includes determining a search window in a target well. The method also includes identifying one or more reference wells based at least partially upon a location of the target well. The method also includes predicting a plurality of locations of a target well marker in the target well based at least partially upon the one or more reference wells. The locations of the target well marker are within the search window. The method also includes determining similarity values for the locations of the target well marker. The method also includes assigning the target well marker to at least one of the locations based at least partially upon the similarity values.

In an embodiment, the method also includes determining a plurality of well signatures of a reference well marker in one of the one or more reference wells based at least partially upon a downhole measurement in the one or more reference wells, and determining whether the well signatures are consistent with one another using a clustering algorithm.

In an embodiment, determining whether the well signatures are consistent with one another includes determining that the well signatures are inconsistent with one another based at least partially upon the well signatures being present in a first cluster and a second cluster. The method also includes determining that the first cluster is more accurate than the second cluster based at least partially upon the first cluster having a higher density of the well signatures than the second cluster.

In an embodiment, the one or more reference wells include a first reference well boundary, a second reference well boundary, and a reference well marker. A predetermined confidence level exists that the reference well marker is positioned between the first and second reference well boundaries. Determining the search window in the target well includes determining a first target well boundary and a second target well boundary. The predetermined confidence level exists that the target well marker is positioned between the first and second target well boundaries. A distance between the first and second reference well boundaries is less than a distance between the first and second target well boundaries.

In an embodiment, predicting the locations of the target well marker includes predicting a first location of the target well marker based at least partially upon a first reference well marker in a first of the one or more reference wells, and predicting a second location of the target well marker based at least partially upon a second reference well marker in a second of the one or more reference wells.

In an embodiment, predicting the locations of the target well marker includes predicting a first location of the target well marker using a first algorithm based at least partially upon a reference well marker in the one or more reference wells, and predicting a second location of the target well marker using a second algorithm based at least partially upon the reference well marker in the one or more reference wells. The first and second algorithms are different.

In an embodiment, the similarity values for the locations of the target well marker are determined based upon at least two of the one or more reference wells and at least two different algorithms.

In an embodiment, the target well marker is assigned to one of the locations having the highest similarity value.

In an embodiment, the method also includes generating or updating a model to include the assignment of the target well marker.

In an embodiment, the target well log has a unit and a description assigned thereto. The target well log does not have a measurement type assigned thereto. The method further includes identifying a plurality of first entries in a database. The first entries have a unit and a measurement type assigned thereto. The units of the first entries are compatible with the unit of the target well log. The method also includes generating a corpus of words from the measurement types of the first entries. The method also includes modifying the description of the target well log based at least partially upon the corpus of words. The measurement also includes identifying one or more second entries in the database. The second entries have a measurement type assigned thereto. The measurement type of the second entries at least partially matches the modified description of the target well log. The method also includes assigning the measurement type of the one or more second entries to the target well log.

Embodiments of the method may also include a method for assigning a measurement type to a well log. The method includes receiving a target well log having a unit and a description assigned thereto. The method also includes identifying a plurality of first entries in a database that have a unit and a measurement type assigned thereto. The units of the first entries are compatible with the unit of the target well log. The method also includes generating a corpus of words based on the measurement types of the first entries. The method also includes modifying the description of the target well log based at least partially upon the corpus of words. The method also includes identifying one or more second entries in the database having a measurement type assigned thereto that at least partially matches the modified description of the target well log. The method also includes assigning the measurement type of the one or more second entries to the target well log.

In an embodiment, generating the corpus of words includes generating one or more n-grams based at least partially upon the measurement types of the first entries.

In an embodiment, modifying the description of the target well log includes removing one or more words from the description of the target well log that are not in the corpus of words.

In an embodiment, the one or more second entries include a subset of the plurality of first entries.

In an embodiment, the measurement type of the first entries includes one or more first n-grams.

The modified description of the target well log includes one or more second n-grams. Identifying the one or more second entries includes identifying the one or more first n-grams that match the one or more second n-grams.

In an embodiment, the one or more second entries includes a plurality of second entries, and assigning the measurement type includes identifying a particular second entry whose measurement type has a highest number of the one or more first n-grams that match the one or more second n-grams, and assigning the measurement type of the particular second entry to the target well log.

In an embodiment, the method also includes generating or updating a model to include the assigned measurement type.

In an embodiment, the method also includes determining a search window in the target well log, identifying one or more reference wells based at least partially upon the target well, predicting a plurality of locations of a target well marker in the target well log based at least partially upon the one or more reference wells, determining similarity values for the locations of the target well marker, and assigning the target well marker to at least one of the locations based at least partially upon the similarity values. The locations of the target well marker are within the search window. Embodiments of the disclosure may also include a non-transitory, computer-readable medium storing instructions that, when executed by one or more processors of a computing system, cause the computing system to perform operations. The operations may include receiving a target well log having a name, a unit, and a description assigned thereto. The operations also include identifying a plurality of first entries in a database that have a unit and a measurement type assigned thereto. The units of the first entries are compatible with the unit of the target well log. The operations also include generating a corpus of words from the measurement types of the first entries. The operations also include modifying the description of the target well log based at least partially upon the corpus of words. The operations also include identifying one or more second entries in the database having a measurement type assigned thereto that at least partially matches the modified description of the target well log. The operations also include assigning the measurement type of the one or more second entries to the target well log. The operations also include determining a search window in the target well log. The operations also include identifying one or more reference wells based at least partially upon the target well log. The operations also include predicting a plurality of locations of a target well marker in the target well log based at least partially upon the one or more reference wells. The locations of the target well marker are within the search window. The operations also include determining similarity values for the locations of the target well marker. The operations also include assigning the target well marker to at least one of the locations based at least partially upon the similarity values.

Embodiments of the disclosure may also include a non-transitory, computer-readable medium storing instructions that, when executed by one or more processors of a computing system, cause the computing system to perform operations. The operations may include determining a search window in a target well. The operations also include identifying one or more reference wells based at least partially upon a location of the target well. The operations also include predicting a plurality of locations of a target well marker in the target well based at least partially upon the one or more reference wells. The locations of the target well marker are within the search window. The operations also include determining similarity values for the locations of the target well marker. The operations also include assigning the target well marker to at least one of the locations based at least partially upon the similarity values.

Embodiments of the disclosure may also include a non-transitory, computer-readable medium storing instructions that, when executed by one or more processors of a computing system, cause the computing system to perform operations. The operations may include receiving a target well log having a unit and a description assigned thereto.

The operations also include identifying a plurality of first entries in a database that have a unit and a measurement type assigned thereto. The units of the first entries are compatible with the unit of the target well log. The operations also include generating a corpus of words based on the measurement types of the first entries. The operations also include modifying the description of the target well log based at least partially upon the corpus of words. The operations also include identifying one or more second entries in the database having a measurement type assigned thereto that at least partially matches the modified description of the target well log. The operations also include assigning the measurement type of the one or more second entries to the target well log.

Embodiments of the disclosure may also include a computing system. The computing system may include one or more processors and a memory system including one or more non-transitory, computer-readable media storing instruction that, when executed by at least one of the one or more processors, cause the computing system to perform operations. The operations may include receiving a target well log having a name, a unit, and a description assigned thereto. The operations also include identifying a plurality of first entries in a database that have a unit and a measurement type assigned thereto. The units of the first entries are compatible with the unit of the target well log. The operations also include generating a corpus of words from the measurement types of the first entries. The operations also include modifying the description of the target well log based at least partially upon the corpus of words. The operations also include identifying one or more second entries in the database having a measurement type assigned thereto that at least partially matches the modified description of the target well log. The operations also include assigning the measurement type of the one or more second entries to the target well log. The operations also include determining a search window in the target well log. The operations also include identifying one or more reference wells based at least partially upon the target well log. The operations also include predicting a plurality of locations of a target well marker in the target well log based at least partially upon the one or more reference wells. The locations of the target well marker are within the search window. The operations also include determining similarity values for the locations of the target well marker. The operations also include assigning the target well marker to at least one of the locations based at least partially upon the similarity values.

Embodiments of the disclosure may also include a computing system. The computing system may include one or more processors and a memory system including one or more non-transitory, computer-readable media storing instruction that, when executed by at least one of the one or more processors, cause the computing system to perform operations. The operations may include determining a search window in a target well. The operations also include identifying one or more reference wells based at least partially upon a location of the target well. The operations also include predicting a plurality of locations of a target well marker in the target well based at least partially upon the one or more reference wells. The locations of the target well marker are within the search window. The operations also include determining similarity values for the locations of the target well marker. The operations also include assigning the target well marker to at least one of the locations based at least partially upon the similarity values.

Embodiments of the disclosure may also include a computing system. The computing system may include one or more processors and a memory system including one or more non-transitory, computer-readable media storing instruction that, when executed by at least one of the one or more processors, cause the computing system to perform operations. The operations may include receiving a target well log having a unit and a description assigned thereto. The operations also include identifying a plurality of first entries in a database that have a unit and a measurement type assigned thereto. The units of the first entries are compatible with the unit of the target well log. The operations also include generating a corpus of words based on the measurement types of the first entries. The operations also include modifying the description of the target well log based at least partially upon the corpus of words. The operations also include identifying one or more second entries in the database having a measurement type assigned thereto that at least partially matches the modified description of the target well log. The operations also include assigning the measurement type of the one or more second entries to the target well log.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 1A, 1B, 1C, 1D, 2, 3A, and 3B illustrate simplified, schematic views of an oilfield and its operation, according to an embodiment.

FIG. 6 illustrates a graph showing three different clusters of well signatures for a particular marker, according to an embodiment.

FIGS. 10A, 10B, and 10C illustrate a flowchart of a method for determining well correlation, according to an embodiment.

DETAILED DESCRIPTION

Figure 2:
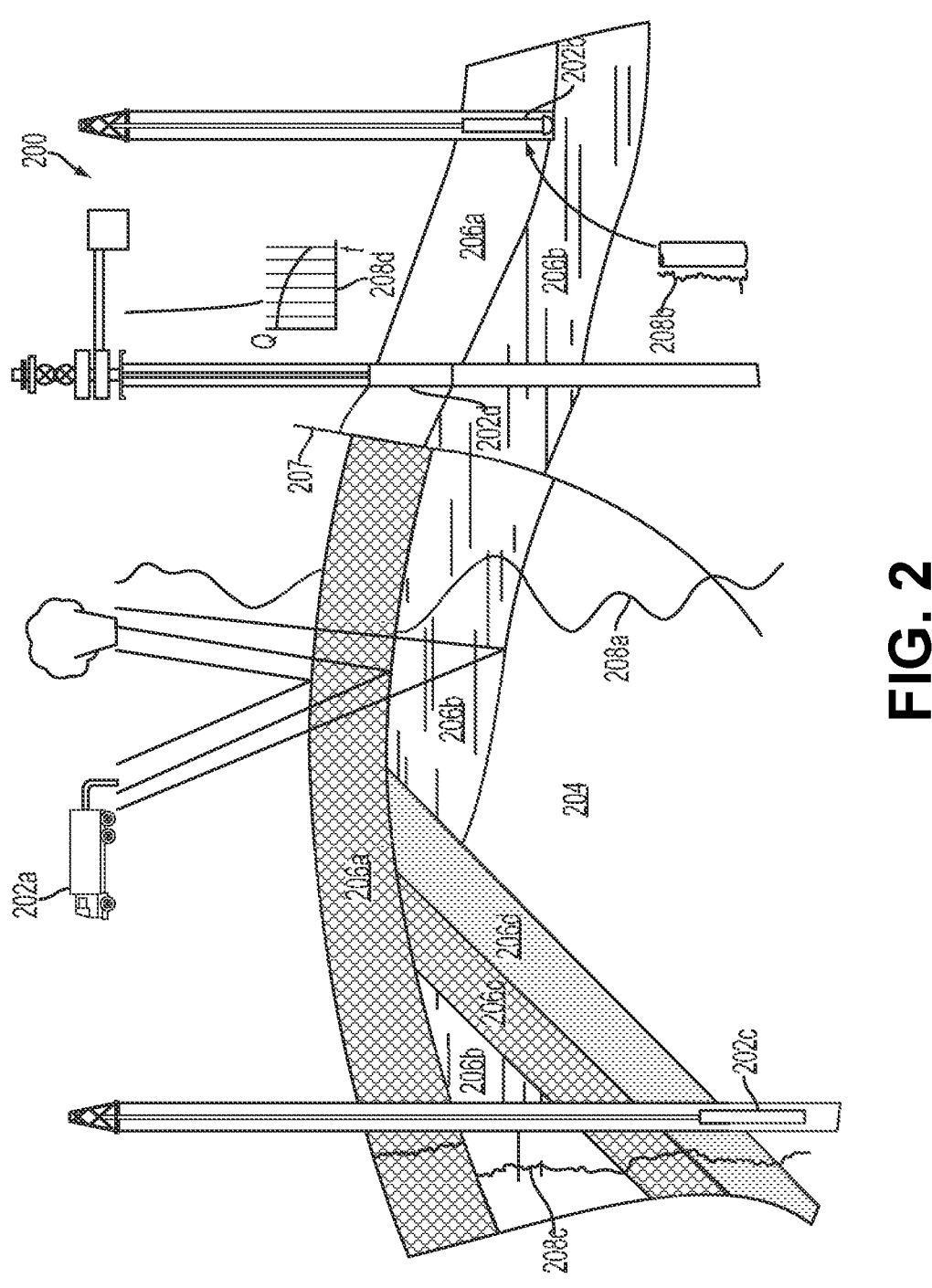

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the invention. The first object and the second object are both objects, respectively, but they are not to be considered the same object.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

FIGS. 1A-ID illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106a, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122a of a seismic truck 106a, and responsive to the input data, computer 122a generates seismic data output 124. This seismic data output may be stored, transmitted or further processed as desired, for example, by data reduction.

FIG. 1B illustrates a drilling operation being performed by drilling tools 106b suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106b may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electro-magnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected. The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

FIG. 1C illustrates a wireline operation being performed by wireline tool 106*c* suspended by rig 128 and into wellbore 136 of FIG. 1B. Wireline tool 106*c* is adapted for deployment into wellbore 136 for generating well logs, performing downhole tests and/or collecting samples. Wireline tool 106*c* may be used to provide another method and apparatus for performing a seismic survey operation. Wireline tool 106*c* may, for example, have an explosive, radioactive, electrical, or acoustic energy source 144 that sends and/or receives electrical signals to surrounding subterranean formations 102 and fluids therein.

Wireline tool 106*c* may be operatively connected to, for example, geophones 118 and a computer 122*a* of a seismic truck 106*c* of FIG. 1A. Wireline tool 106*c* may also provide data to surface unit 134. Surface unit 134 may collect data generated during the wireline operation and may produce data output 135 that may be stored or transmitted. Wireline tool 106*c* may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106*c* to measure downhole parameters which relate to, for example porosity, permeability, fluid composition and/or other parameters of the field operation.

FIG. 1D illustrates a production operation being performed by production tool 106*d* deployed from a production unit or Christmas tree 129 and into completed wellbore 136 for drawing fluid from the downhole reservoirs into surface facilities 142. The fluid flows from reservoir 104 through perforations in the casing (not shown) and into production tool 106*d* in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106*d* or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202*a*, 202*b*, 202*c* and 202*d* positioned at various locations along oilfield 200 for collecting data of subterranean formation 204 in accordance with implementations of various technologies and techniques described herein. Data acquisition tools 202*a*-202*d* may be the same as data acquisition tools 106*a*-106*d* of FIGS. 1A-1D, respectively, or others not depicted. As shown, data acquisition tools 202*a*-202*d* generate data plots or measurements 208*a*-208*d*, respectively. These data plots are depicted along oilfield 200 to demonstrate the data generated by the various operations.

Data plots 208*a*-208*c* are examples of static data plots that may be generated by data acquisition tools 202*a*-202*c*, respectively; however, it should be understood that data plots 208*a*-208*c* may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208*a* is a seismic two-way response over a period of time. Static plot 208*a* is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208*c* is a logging trace that typically provides a resistivity or other measurement of the formation at various depths.

A production decline curve or graph 208*d* is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206a-206d. As shown, this structure has several formations or layers, including a shale layer 206a, a carbonate layer 206b, a shale layer 206c and a sand layer 206d. A fault 207 extends through the shale layer 206a and the carbonate layer 206b. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208a from data acquisition tool 202a is used by a geophysicist to determine characteristics of the subterranean formations and features. The core data shown in static plot 208b and/or log data from well log 208c are typically used by a geologist to determine various characteristics of the subterranean formation. The production data from graph 208d is typically used by the reservoir engineer to determine fluid flow reservoir characteristics. The data analyzed by the geologist, geophysicist and the reservoir engineer may be analyzed using modeling techniques.

Figure 3A:
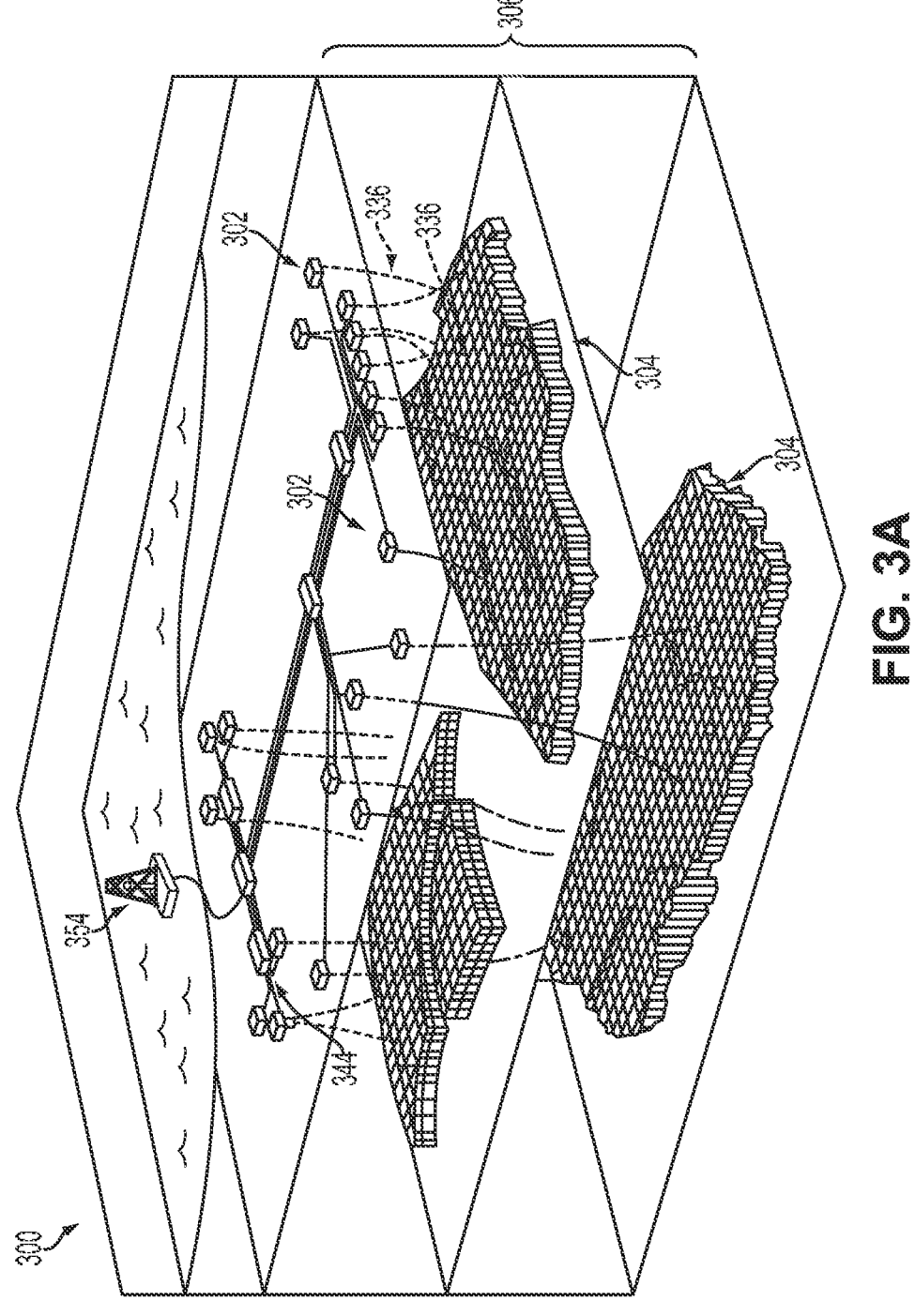

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 3B:
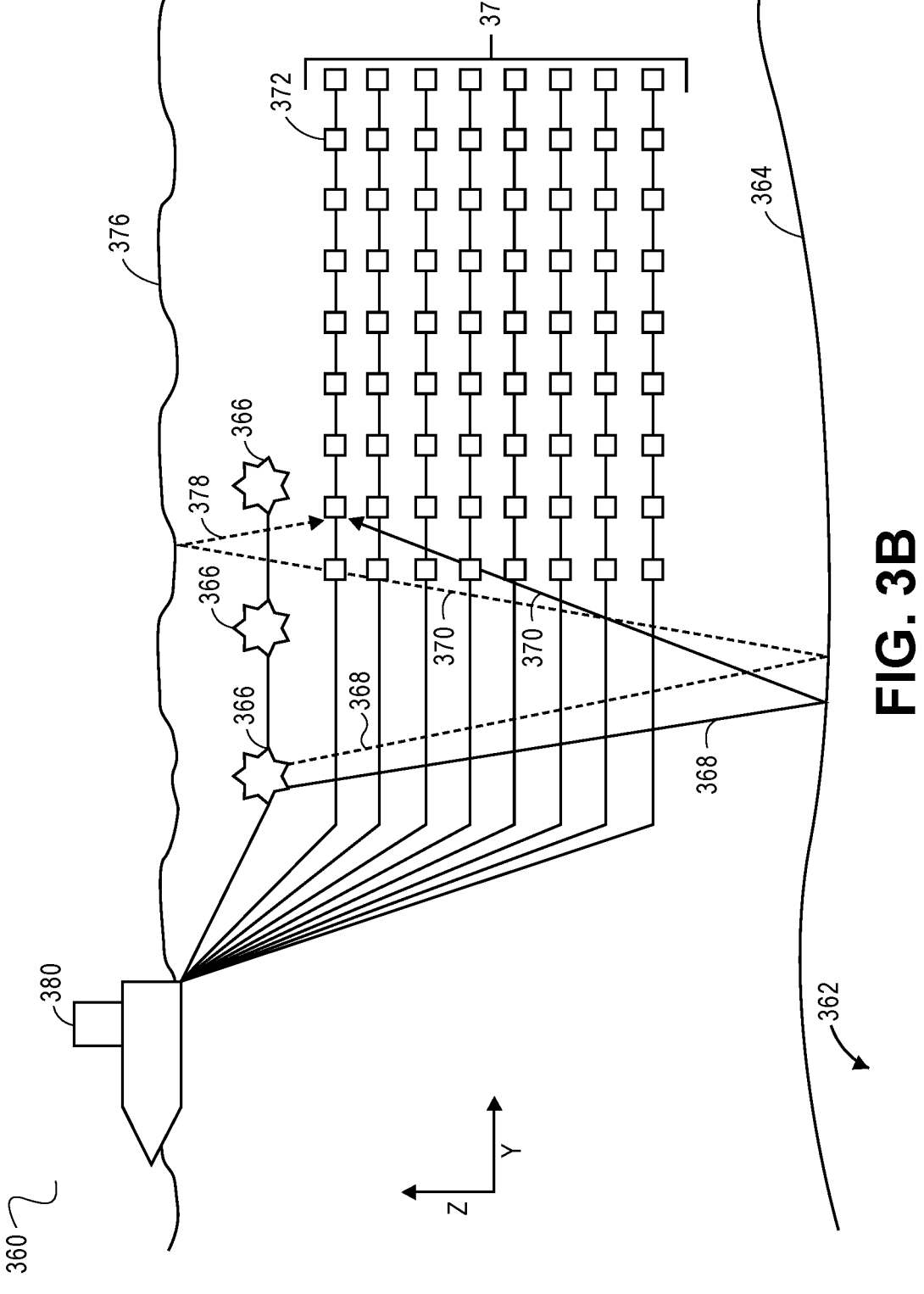

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362.

Marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

Determining Markers Between Layers in a Subterranean Formation

The systems and methods disclosed herein may perform an automatic well log correlation. For example, the systems and methods may be used to correlate wells from a reference well that is selected by a user (e.g., a geologist). The reference well's log signature around a marker may be compared to well log signatures in one or more target wells. As used herein, a "well log signature" refers to well log patterns which can indicate a change of formations. The natural gamma ray log may be used because it is related to those kinds of changes. The systems and methods may then perform a quantitative similarity analysis from this comparison. Once a well log signature is detected in the well with a high similarity coefficient between the reference well and the target wells, the marker from the reference well can be assigned to the target well.

Quality of Labeled Markers

In situations where a plurality of wells is labeled (e.g., with markers picked by geologists), the quality of an automatic propagation may be dependent on the quality of the markers. If the markers are selected inconsistently, e.g., by different geologists, there may be potential differences in the log signatures where a marker has been selected. To check if the markers are selected consistently or not, a review of the input markers may be carried out. In a large dataset (e.g., hundreds or thousands of wells), a manual review may be time consuming and tedious, and can be prone to human error. The systems and methods described herein may help by reviewing the markers to identify errors so that the errors are not propagated.

Marker Search Window in the Wellbore

Well logs may range up to 8000 ft (2438 m), which can make algorithms time consuming to run. This is a large window to search for a well log signature, and it is possible that a certain marker's well log signature is non-unique and repeats in various parts of the well, making it difficult for the algorithm to detect the accurate interval to select the marker. Additionally, if the logs are acquired in different formations, the marker that is expected may not even be present in the target well. The systems and methods described herein may automatically select an appropriate search window within which a marker may be searched.

Changing Log Responses Due to Lateral Geological Variability

Geological layers can span several hundred kilometers over which their formation properties and thicknesses can change. Such changes lead to a laterally varying set of well log responses around the same marker. Variability may be further complicated by geological faults and/or other structural complexities that may cause sudden changes in the vertical depth of a marker from one well to the next. These sudden changes may have a directional trend. The systems and methods described herein may select a similar reference well to carry out an auto-marker selection and/or select an appropriate search window within which a marker may be searched.

Quality of Propagated Marker

Once the automated marker picking workflow finishes running, the quality of predicted markers may be analyzed, because, while some predicted markers may be selected accurately, others may not. The systems and methods described herein may help by reviewing the markers after propagation.

The systems and methods described herein may assign markers in one or more target wells in a subterranean formation, thereby transforming the target wells from unlabeled wells to labeled wells. As used herein, a "labeled well" is a well where one or more markers have been assigned, and an "unlabeled well" is a well where one or more markers have not been assigned. The systems and methods may also or instead generate a model (e.g., a structure map) of the subterranean formation based at least partially upon previously labeled reference wells (e.g., wells labeled by a geologist), unlabeled target wells, or a combination thereof. The inputs may be or include one or more well logs (e.g., quad combo well logs) of previously labeled reference wells, which have markers selected by a geologist. The inputs may also or instead include other data such as cuttings, drilling information, seismic information, etc. The system and method may select markers in unlabeled target wells based at least partially upon these inputs.

The systems and methods described herein may use a clustering routine/algorithm to assess the quality (e.g., accuracy) of markers in previously labeled reference wells before a propagation algorithm is carried out to assign markers in unlabeled target wells. The clustering algorithm may summarize large amounts of multi-dimensional data into groups. The clustering algorithm may be or include a hierarchical clustering algorithm or a k-means clustering algorithm.

The systems and methods described herein may also reduce a search window where a marker may be located using geostatistical routines over an area of interest. As used herein, a "search window" refers to an interval having a first (e.g., upper) boundary and a second (e.g., lower) boundary, between which a marker is to be placed/assigned.

The systems and methods described herein may also (e.g., automatically) select the most similar reference well(s) to carry out an automatic marker selection in an unlabeled target well, taking in account the possible lateral geological variability by exploring other orientated labeled reference wells (e.g., by quadrant) and selecting the most correlated labeled reference well. As used herein, an "automatic marker selection" refers to a selection by a computing system, as opposed to by a person (e.g., a geologist), of a marker between two layers of a subterranean formation. The systems and methods described herein may also again use the clustering routine to assess the quality of the propagated markers.

Figure 4:
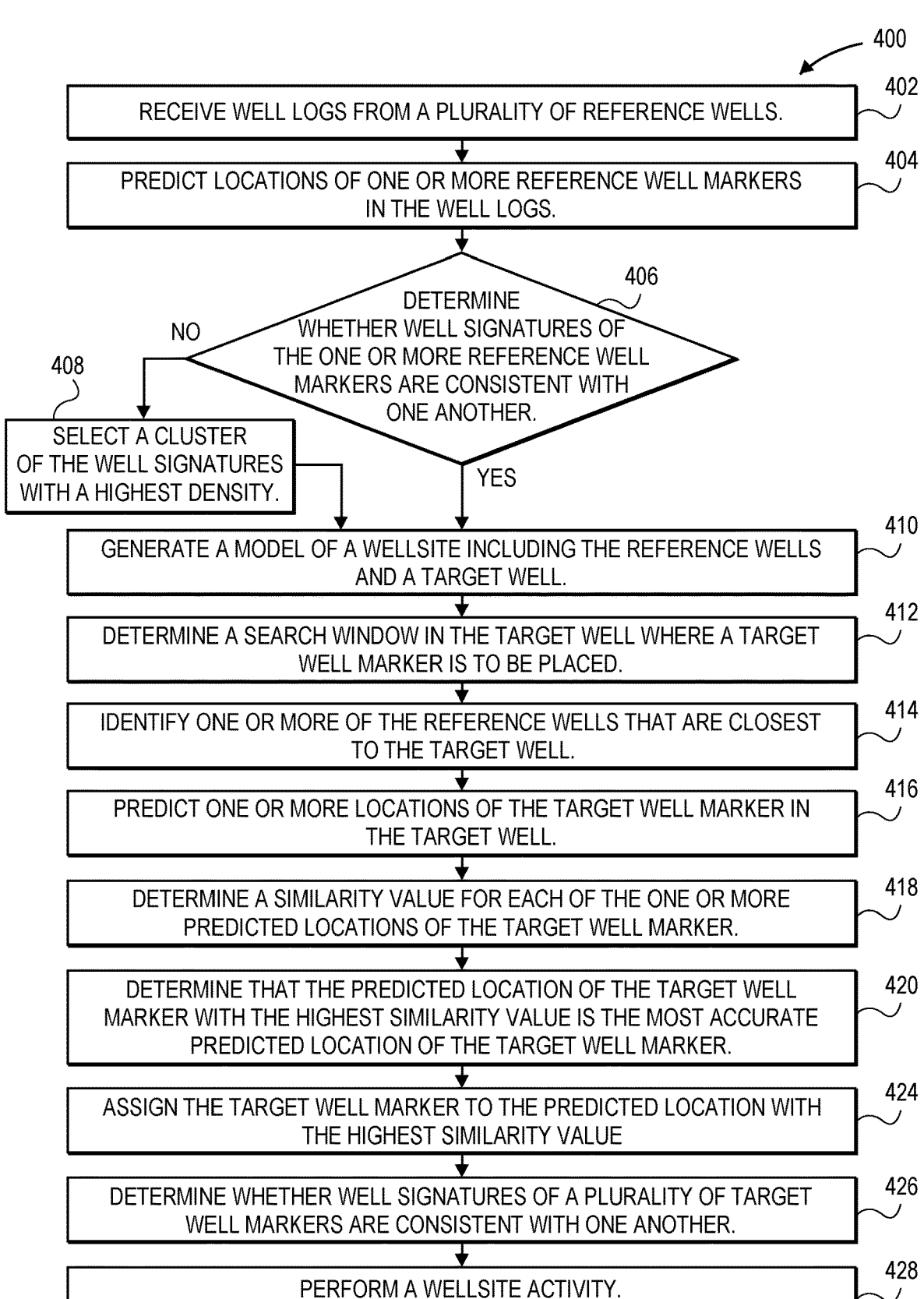
FIG. 4 illustrates a flowchart of a method for assigning markers in a well log, according to an embodiment.

FIG. 4 illustrates a flowchart of a method 400 for assigning markers in a well log that is measured in a well that extends in a subterranean formation, according to an embodiment. An illustrative order of the method 400 is provided below; however, one or more portions of the method 400 may be performed in a different order, combined, separated into two or more portions, performed simultaneously, repeated, or omitted. One or more portions of the method 400 may be performed by a computing system 1100, which is described below.

Figure 5:
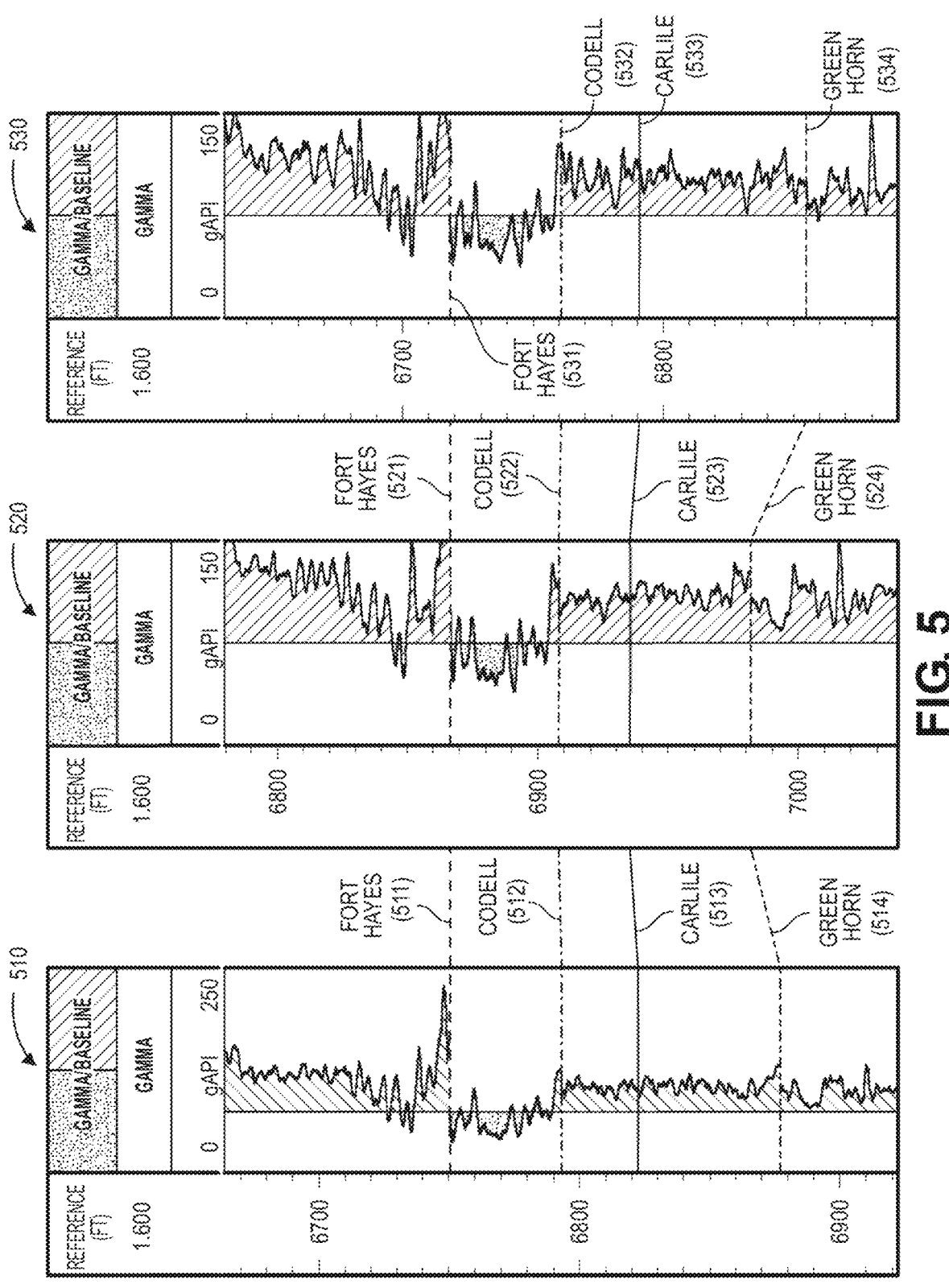
FIG. 5 illustrates a graph showing gamma ray logs for three wells, according to an embodiment.

The method 400 may include receiving well logs from a plurality of reference wells, as at 402. FIG. 5 illustrates a graph 500 showing well logs 510, 520, 530 from three reference wells, according to an embodiment. The well logs 510, 520, 530 may be measured by a downhole tool, which may be or include any of the data acquisition tools 106a-106d described above. The well logs 510, 520, 530 in FIG. 5 are gamma ray logs. In another embodiment, the well logs may also or instead be or include pressure logs, temperature logs, resistivity logs, porosity logs, sonic velocity logs, density logs, or a combination thereof.

The method 400 may also include predicting locations of one or more markers in the well logs 510, 520, 530, as at 404. As mentioned above, a marker refers to a boundary between two layers of a subterranean formation. The first gamma ray log 510 includes four markers: 511, 512, 513, 514; the second gamma ray log 520 includes four markers: 521, 522, 523, 524; and the third gamma ray log 530 includes four markers: 531, 532, 533, 534. Predicting the locations of the markers 511-514, 521-524, 531-534 converts well logs 510, 520, 530 and/or the corresponding reference wells from unlabeled to labeled. In one embodiment, the predictions may be performed by a user (e.g., a geologist or a geophysicist). In another embodiment, the predictions may be performed by the computing system 1100. The predictions may be based on the identification of pattern similarities. For example, in FIG. 5, the high gamma ray peak may be used to identify the top (e.g., the upper boundary of a stratum).

The method 400 may also include determining whether well signatures of the one or more markers are consistent with one another, as at 406. In one embodiment, a clustering algorithm may be used to determine whether the well signatures of the one or more markers are consistent with one another. For example, if a single cluster of well signatures of a particular marker is identified, it may be determined that the well signatures for that particular marker are consistent. However, if multiple clusters of well signatures of a particular marker are identified, it may be determined that the well signatures for that particular marker are inconsistent.

Figure 6:
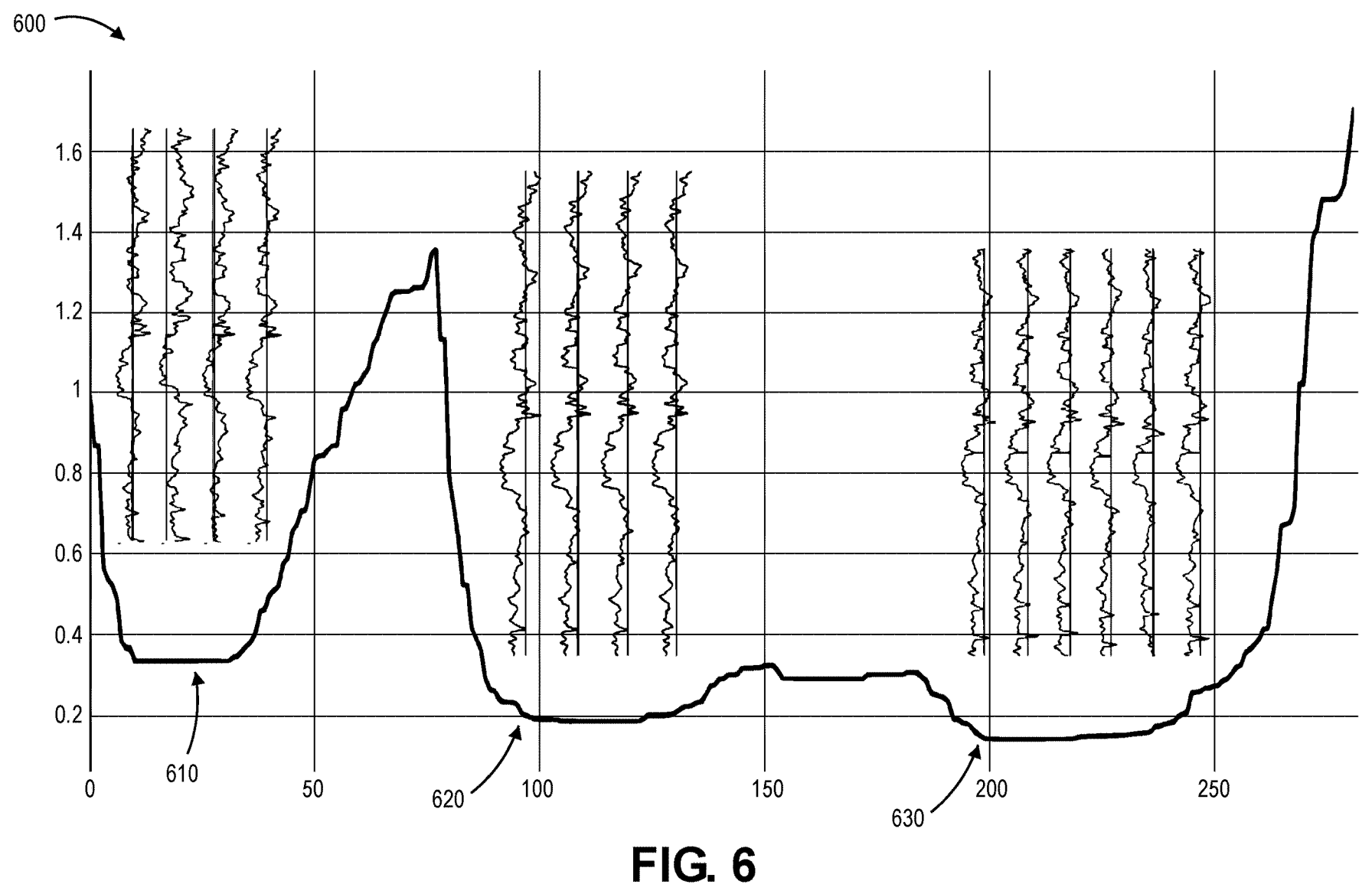

FIG. 6 illustrates a graph 600 showing three different clusters 610, 620, 630 of well signatures for a particular marker (e.g., marker 511), according to an embodiment. In FIG. 6, the X axis represents the signatures of one top formation for each well ordered by their similarity, and the Y axis represents the reachability value or similarity value of one top pattern to be similar to the closest one. The graph 600 may be referred to as a reachability plot. The clustering algorithm provides a two-dimensional (2D) reachability graph 600 showing the clusters 610, 620, 630 in a dataset, where the valleys represent the clusters 610, 620, 630. As used herein, a "cluster" includes two or more signatures of the particular marker 511 that have common/similar pattern. In the graph 600, the first cluster 610 includes four signatures: 611-614; the second cluster 620 includes four signatures: 621-624; and the third cluster 630 includes six signatures: 631-636. As there are multiple clusters 610, 620, 630, it may be determined that the well signatures for this particular marker 511 are inconsistent.

If the marker 511 has well signatures that are consistent with one another (e.g., a single cluster is present), then the marker 511 may be determined to be accurate/valid. If the marker 511 has well signatures that are inconsistent with one another, as in FIG. 6, then the method 400 may also include selecting a cluster of the well signatures with a highest density, as at 408. The cluster with the highest density is the cluster with the lowest average reachability value (e.g., the lowest valley in the graph 600). The high density cluster may not be related to the number of wells in one cluster; however, it may be related if the user (e.g., geologist) made an accurate prediction. The cluster 630 with the highest density may be determined to be the most accurate/valid cluster for the particular marker 511.

Figure 7:
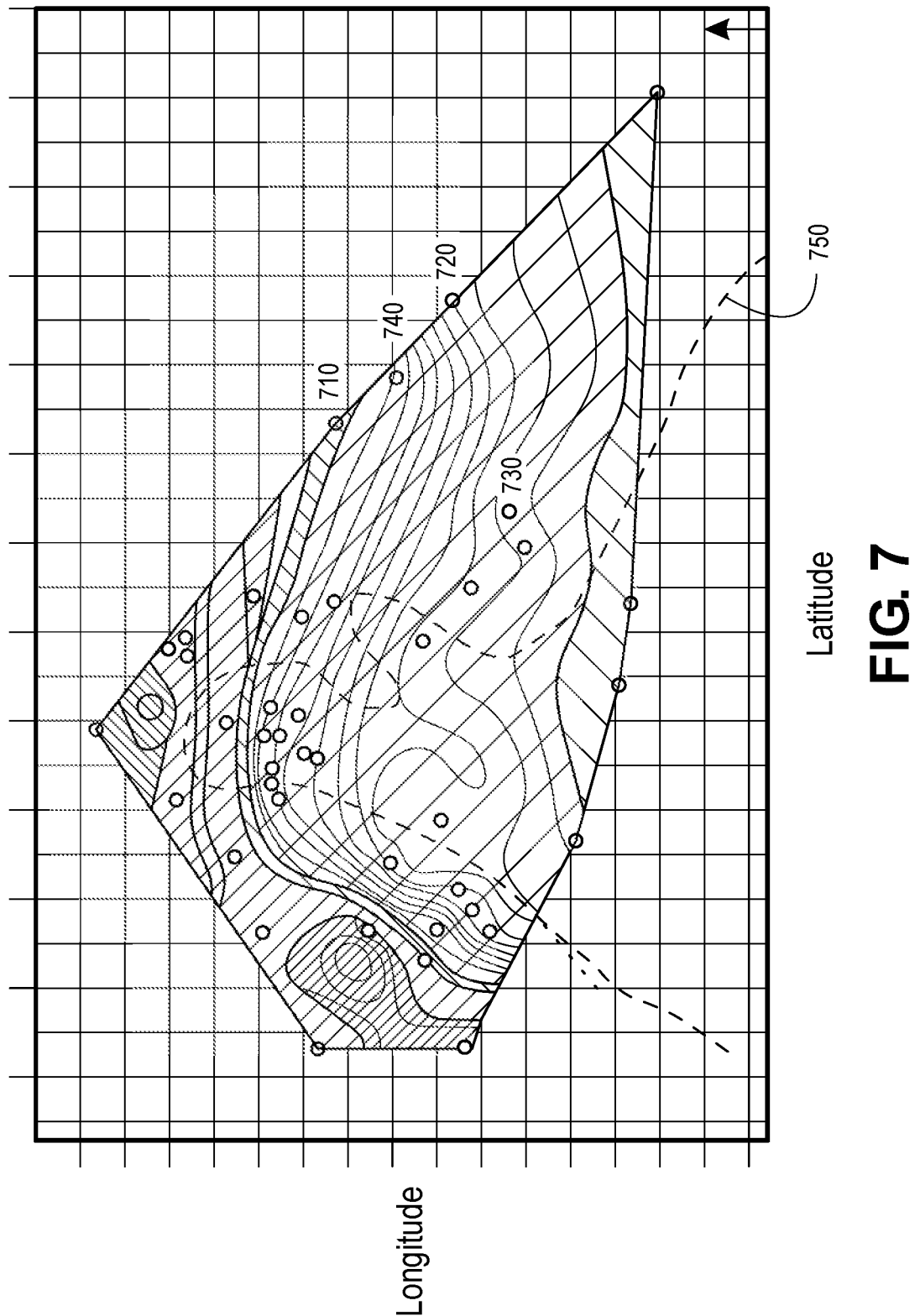
FIG. 7 illustrates a model of a wellsite including one or more reference wells and one or more target wells, according to an embodiment.

Once the reference wells are filtered to determine/confirm the accuracy of the markers 511-514, 521-524, 531-534 (e.g., using one or more of steps 406 and/or 408), the method 400 may also include generating a model of a wellsite including the reference wells, as at 410. FIG. 7 illustrates a model of a wellsite 700 including reference wells 710, 720, 730 and a target well 740, according to an embodiment. The well log 510 may have been captured in the first reference well 710, the well log 520 may have been captured in the second reference well 720, and the well log 530 may have been captured in the third reference well 730. The target well 740 may be or include an unlabeled well where the markers have yet to be predicted/placed.

In FIG. 7, the X axis represents the latitude, and the Y axis represents the longitude. The line 750 represents an iso-curve of probable depth of a specific formation top. The model 700 may be generated based at least partially upon the reference wells 710, 720, 730, the well logs 510, 520, 530 measured in the reference wells 710, 720, 730, the markers

511-514, 521-524, 531-534 in the well logs 510, 520, 530, or a combination thereof. The model 700 may also or instead be based at least partially upon data (e.g., pressure logs, temperature logs, density logs, resistivity logs, porosity logs, sonic velocity logs, or a combination thereof) measured in the reference wells 710, 720, 730 by the downhole tools (e.g., data acquisition tools 106a-106d).

Figure 8:
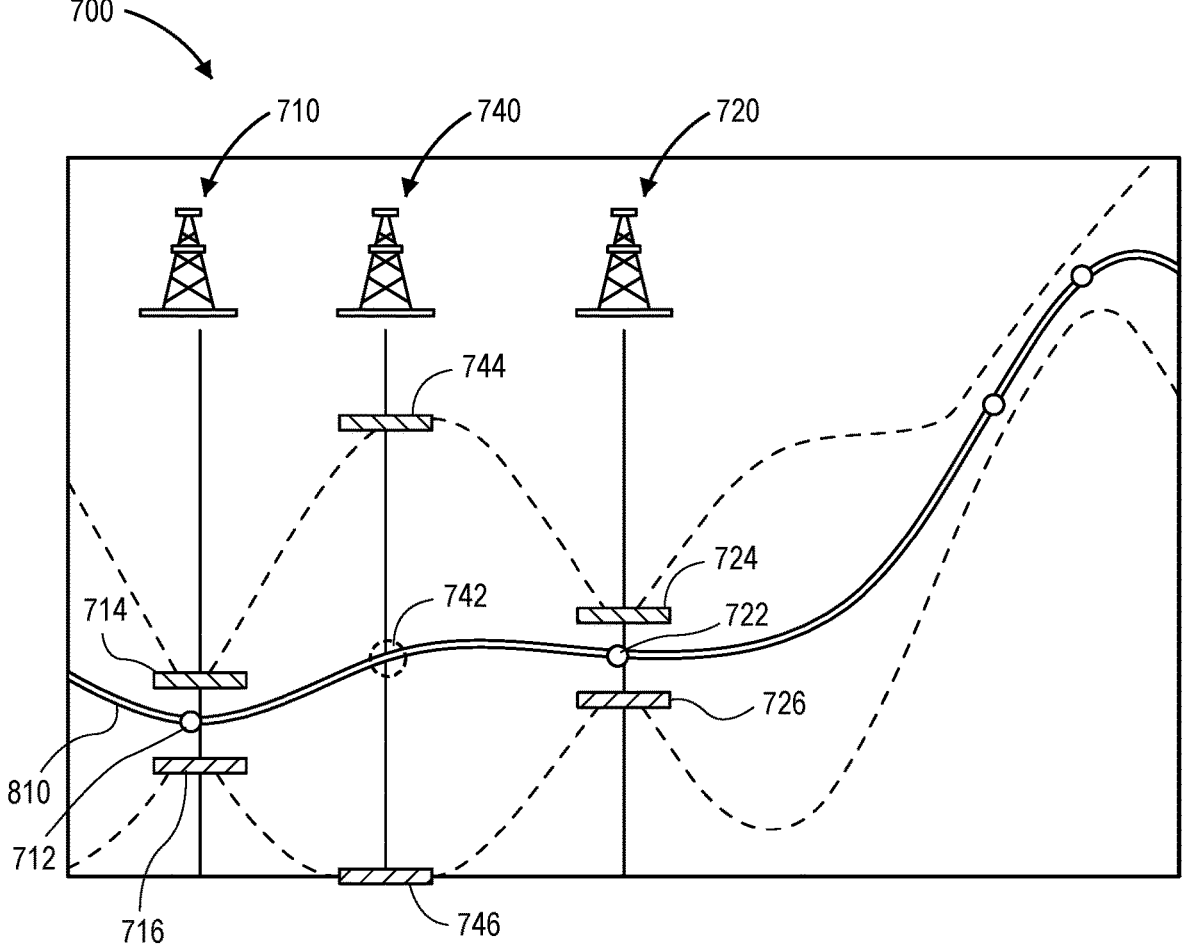
FIG. 8 illustrates a schematic side view of the wellsite including two of the reference wells and one of the target wells, according to an embodiment.

The method 400 may also include determining a search window in a target well 740 where a marker is to be placed, as at 412. FIG. 8 illustrates a schematic side view of the wellsite 700 including two of the reference wells 710, 720 and the target well 740, according to an embodiment. The target well 740 may be positioned at least partially between the reference wells 710, 720. The line 810 may represent the boundary between two layers of the subterranean formation.

The reference wells 710, 720 may have markers 712, 722 that identify the intersection between the boundary 810 and the reference wells 710, 720. However, as will be appreciated, the placement/position of the markers 712, 722 may be a prediction (e.g., made by a geologist). In at least one embodiment, the reference wells 710, 720 may also have windows including first (e.g., upper) boundaries 714, 724 and second (e.g., lower) boundaries 716, 726, between which the markers 712, 722 are located. There may be a predetermined confidence level (e.g., 90%) that the boundary 810 is located within the windows.

The search window for the target well 740 may also include a first (e.g., upper) boundary 744 and a second (e.g., lower) boundary 746. The boundaries 744, 746 may be selected such that the same confidence level (e.g., 90%) exists that the boundary 810 is located within the search window. The search window for the target well 740 may be determined using a gaussian process, such as a kriging algorithm, that is based at least partially upon the markers 712, 722 in the reference wells 710, 720, data (e.g., pressure logs, temperature logs, resistivity logs, porosity logs, sonic velocity logs, or a combination thereof) measured in the reference wells 710, 720 and/or the target well 740 by the downhole tools (e.g., data acquisition tools 106a-106d), the model 700, or a combination thereof. A distance between the boundaries 744, 746 of the target well 740 may be greater than distances between the boundaries 714, 716 and 724, 726 of the reference wells 710, 720.

Once the search window has been determined, one or more of the reference wells 710, 720 may be selected to propagate the marker(s) 712, 722 therein to the target well 740. More particularly, the method 400 may also include identifying one or more of the reference wells 710, 720 that are closest to the target well 740, as at 414. In one embodiment, "closest" may refer to a lateral distance (e.g., in meters). In another embodiment, "closest" may refer to the most similar correlation between two wells (e.g., well signatures of two wells). In yet another embodiment, the geographically closest wells (e.g., in meters) may be selected, and from those selected wells, the ones with the most similar well signature correlation and/or dynamic time warping distance may be selected. In one embodiment, identifying one or more of the reference wells 710, 720 that are closest to the target well 740 may include identifying the closest reference well in each quadrant (e.g., north, south, east, and west). This would include four closest reference wells. In the example shown in FIG. 7, the reference well 710 is in the northwest quadrant from the target well 740, the reference well 720 is in the southeast quadrant from the target well 740, and the reference well 730 is in the southwest quadrant from the target well 740 (FIG. 7 does not show a reference well in the northeast quadrant). Using multiple closest reference wells (e.g., in different quadrants) may help to account for potential geological variability and/or invariability in the various directions. In another embodiment, each quadrant may be split into two or more smaller portions, with the closest reference well in each portion being identified.

The method 400 may also include predicting one or more location(s) of a marker 742 in the target well 740, as at 416. The location(s) of the marker 742 may be predicted within the search window between the boundaries 744, 746. The location(s) of the marker 742 may be predicted based at least partially upon the reference wells 710, 720 that are closest to the target well 740. More particularly, the locations of the marker 742 may be predicted based at least partially upon the markers 712, 722 in the reference wells 710, 720 that are closest to the target well 740. The prediction(s) may be performed by the computing system 1100 using a marker propagation algorithm such as a dynamic time warping (DTW) algorithm, a spiking neural network (SNN) algorithm, or both.

In an example where a single algorithm is used to predict the locations of the marker 742, a first prediction of the location of the marker 742 may be based at least partially upon the marker 712 in the first reference well 710, and a second prediction of the location of the marker 742 may be based at least partially upon the marker 722 in the second reference well 720. In an example where multiple (e.g., two) algorithms are used to predict the locations of the marker 742, a first prediction of the location of the marker 742 may be based at least partially upon the marker 712 in the first reference well 710 using the DTW algorithm, a second prediction of the location of the marker 742 may be based at least partially upon the marker 712 in the first reference well 710 using the SNN algorithm, a third prediction of the location of the marker 742 may be based at least partially upon the marker 722 in the second reference well 720 using the DTW algorithm, and a fourth prediction of the location of the marker 742 may be based at least partially upon the marker 722 in the second reference well 720 using the SNN algorithm.

The method 400 may also include determining a similarity value for each of the one or more predicted locations of the marker 742, as at 418. The similarity values may be based at least partially upon the locations of the markers 712, 722 in the closest reference wells 710, 720, the well logs 510, 520 of the closest reference wells 710, 720, the predicted locations of the marker 742 in the target well 740, the well log of the target well 740, the algorithms, or a combination thereof.

Continuing with the example where a single algorithm is used, this step may include determining a first similarity value for the first predicted location of the marker 742 based upon a comparison of a portion of the well log of the target well 740 that includes the first predicted location of the marker 742 and a corresponding portion of the well log 510 of the first reference well 710 that includes the marker 712, and determining a second similarity value for the second predicted location of the marker 742 based upon a comparison of a portion of the well log of the target well 740 that includes the second predicted location of the marker 742 and a corresponding portion of the well log 520 of the second reference well 720 that includes the marker 722.

Continuing with the example where multiple (e.g., two) algorithms are used, this step may include determining a first similarity value for the first predicted location of the marker 742 based upon a comparison of a portion of the well log of the target well 740 that includes the first predicted location of the marker 742 and a corresponding portion of the well log 510 of the first reference well 710 that includes the marker 712, determining a second similarity value for the second predicted location of the marker 742 based upon a comparison of a portion of the well log of the target well 740 that includes the second predicted location of the marker 742 and a corresponding portion of the well log 510 of the first reference well 710 that includes the marker 712, determining a third similarity value for the third predicted location of the marker 742 based upon a comparison of a portion of the well log of the target well 740 that includes the third predicted location of the marker 742 and a corresponding portion of the well log 520 of the second reference well 720 that includes the marker 722, and determining a fourth similarity value for the fourth predicted location of the marker 742 based upon a comparison of a portion of the well log of the target well 740 that includes the fourth predicted location of the marker 742 and a corresponding portion of the well log 520 of the second reference well 720 that includes the marker 722.

In one embodiment, the portion(s) of the well log 510 for the first reference well 710 used to determine the similarity values may be between the boundaries 714, 716, the portion(s) of the well log 520 for the second reference well 720 used to determine the similarity values may be between the boundaries 724, 726, and the portion(s) of the well log for the target well 740 may be between the boundaries 744, 746. In one embodiment, one or more of the portions of the well log of the target well 740 that include the first predicted location of the marker 742, the second predicted location of the marker 742, the third predicted location of the marker 742, and/or the fourth predicted location of the marker 742 may be at least partially offset from one another (e.g., partial overlap or no overlap) in the well log.

The method 400 may also include determining that the predicted location of the marker 742 with the highest similarity value is the most accurate predicted location of the marker 742, as at 420. For example, if the third similarity value has the greatest/highest value, then the third predicted location of the marker 742 may be determined to be the most accurate predicted location of the marker 742. In addition, if the third similarity value has the greatest/highest value, then the second reference well 720 may be determined to be the most similar first well, and the DTW algorithm may be determined to be the most accurate algorithm. If using different methods (e.g., wells selected and algorithm choice), the method 400 yields different locations for one marker predicted, and one of these locations is to be selected. The method 400 may select the location that as the highest correlation with the respective selected wells.

The method 400 may also include assigning the marker 742 to at least one of the predicted locations based at least partially upon the similarity values, as at 424. For example, this may include assigning the marker 742 to the predicted location with the highest similarity value. In one embodiment, the portions 420 and 424 may be combined.

In one embodiment, the method 400 may then loop back (e.g., to 402, 404, 410, or 412) to assign different markers in the target well 740 (or other target wells). If this results in a plurality of markers being assigned, the method 400 may also include determining whether well signatures of the plurality of markers (including marker 742) are consistent with one another, as at 426. In other words, the clustering algorithm may be run again on the markers to check the consistency. This may be omitted if there is a single predicted marker.

The method 400 may also include performing a wellsite activity, as at 428. The wellsite activity may be based at least partially upon the well logs, including the marker 742 assigned to the well log of the well 740. The wellsite activity may be or include generating or updating the model 700 (e.g., in FIG. 7 and/or FIG. 8) to include the marker 742 and/or to adjust the boundaries 744, 746. The wellsite activity may also or instead be or include planning a path/trajectory of the wellbore 136 in the subterranean formation 102. The wellsite activity may also or instead include modifying the path/trajectory of the wellbore 136 in the subterranean formation 102. The wellsite activity may also or instead include drilling the wellbore 136 in the subterranean formation 102 based at least partially upon the planned or modified path/trajectory. The wellsite activity may also or instead include varying the weight on the drill bit (WOB), the rate of penetration (ROP), the type of fluid pumped into the wellbore 136, the volumetric rate of fluid pumped into the wellbore 136, or a combination thereof.

Determining Measurement Types in Well Logs

As mentioned above, the downhole data acquisition tool 106a-106d (e.g., logging tool) may measure data while in a well. The data may be or include well logs, such as the gamma ray logs 510, 520, 530 discussed above. The well logs may include one or more curves that have associated heterogeneous names (e.g., acronyms), units, descriptions, and/or measurements data, which are stored in standard format files such as DLIS or LAS format. Sometimes, however, the data may not specify the type of measurement (also referred to as a "family"). Illustrative types of measurements may include gamma ray measurements, temperature measurements, pressure measurements, resistivity measurements, porosity measurements, sonic velocity measurements, etc.

The systems and methods disclosed herein may (e.g., automatically) identify the type of measurement (i.e., family) in a well log imported from DLIS or LAS files based at least partially upon the name of the well log, the unit(s) of the well log, the description of the well log, or a combination thereof. The type of measurement may also be based at least partially upon a database (e.g., dictionary) and/or manually created rules. The database may include a plurality of well log names and units associated with a particular family. An example of a portion of the database is shown in Table 1 below.

The systems and methods disclosed herein may first determine if the imported curve name (also referred to as well log name) is in the database. If so, the curve name may be assigned the corresponding family in the database. For example, an imported well log with the name "C11_TIV" may be assigned to the Elastic Modulus Family. If the curve name is not in the database, the system and method may apply hard-coded family assignment rules. For example, curves with the name starting with "ECGR" may be assigned to the "Gamma Ray Minus Uranium" family. In another example, curves containing "AZIM" in the name may be assigned to the "Hole Azimuth" family. This may help a user (e.g., a petrophysicist) assign a curve to a corresponding family; however, sometimes it may be unable to link a curve to a family. Thus, the system and method may also use the "description" information of the curves and/or a string metric to find the closest entry (e.g., corresponding family) in the database.

Figure 9:
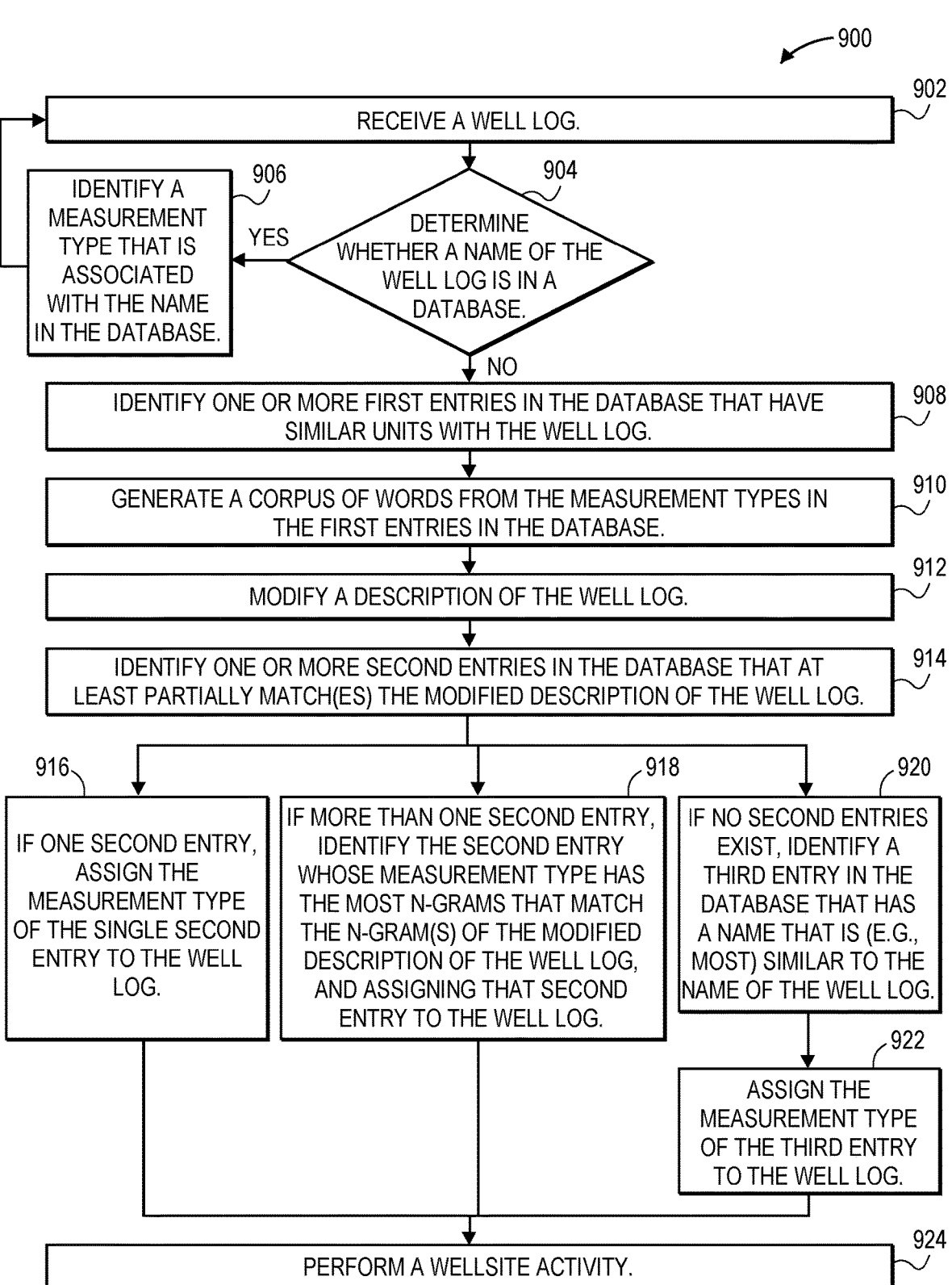
FIG. 9 illustrates a flowchart of a method for identifying the type of measurement (i.e., family) of a well log curve, according to an embodiment.

FIG. 9 illustrates a flowchart of a method 900 for (e.g., automatically) identifying the type of measurement (i.e., family) of a well log, according to an embodiment. An illustrative order of the method 900 is provided below; however, one or more portions of the method 900 may be performed in a different order, performed simultaneously (e.g., in parallel), repeated, or omitted. One or more portions of the method 900 may be performed by the computing system 1100.

In one embodiment, the graph (or well log) may not take into consideration the unit. The following example describes the relevance of the unit. The curve name: "CNC" has in the database the associated "Capture Nickel-Chromium Relative Yield" family with the associated relative yield unit and has also the "Neutron Porosity" family with the associated porosity unit. Thus, if a CNC input curve name exists, the user may then check the compatibility of the unit to select either the "Capture Nickel-Chromium Relative Yield" or the "Neutron Porosity".

The method 900 may include receiving a well log, as at 902. As mentioned above, the well log may be measured and/or transmitted by one or more downhole tools (e.g., data acquisition tools 106a-106d). The well log may include a name (e.g., a mnemonic or acronym), a unit, a description, or a combination thereof. An example of the name, unit, and description of a well log is provided in table 2 below. The well log may not include a measurement type (i.e., family).

TABLE 1

| Curve name | Description | Family | Unit Quantity |
|---|---|---|---|
| C11_TIV | Elastic Constant C11 referred to TI Axis in TI . . . | Elastic Modulus | ElasticModulus |
| C13_TIV | Elastic Constant C13 referred to TI Axis in TI . . . | Elastic Modulus | ElasticModulus |
| C18V | Controller Power Supply + 1.8 V | Electric Potential | ElectricPotential |
| C18V_IDFR | IDFR002 + 1.8 V Voltage | Electric Potential | ElectricPotential |
| C1AT | Detector 1 Coincidence Spectrum Accumulation Time | Acquisition Time | Time |
| C1AZ | Caliper 1 Azimuth | Pad A Azimuth | PlaneAngle |
| C1BR | Detector 1 Coincidence Bad Baseline Count Rate | Count Rate | CountRate |
| C1CC | Sonde 1 Command Count | Count | Unitless |
| C1CC_R | Sonde 1 Command Error | Count | Unitless |
| C1DT | Detector 1 Coincidence Dead Time Count Rate | Count Rate | CountRate |

TABLE 2

| Name | Unit | Description |
|------|------|-------------|
| PFC | GAPI | PFC Internal Gamma Ray Curve |

The method 900 may also include determining whether the name of the well log is in a database, as at 904. If the name is in the database, the method 900 may include identifying a measurement type (i.e., family) that is associated with the name in the database, as at 906. The method 900 may then loop back to the beginning and repeat for another well log.

If the name is not in the database, the method 900 may include identifying one or more first entries in the database that have similar units with the well log, as at 908. Each of the one or more first entries in the database may include a measurement type (i.e., family), a name (e.g., a mnemonic or acronym), a unit, a description, or a combination thereof. In one embodiment, "similar units" may refer to compatible units (i.e., units that describe the same property). For example, when considering mass, the units kilogram and pound may be similar/compatible. In another example, when considering length, the units inch and centimeter may be similar/compatible. An n-gram is a contiguous sequence of n items from a given sample of text or speech. The items can be phonemes, syllables, letters, words, or base pairs according to the application. The n-grams may be collected from a text or speech corpus. N-grams decomposition may be applied on families and descriptions, but not units.

The method 900 may also include generating a corpus of words from the measurement types (i.e., families) in the first entries in the database, as at 910. The words may be case sensitive or case insensitive. Generating the corpus of words from the measurement types in the first entries may include generating n-grams based at least partially upon the measurement types in the first entries. For example, one of the first entries may have the measurement type "Gamma Ray." An n-gram (e.g., a bi-gram) may then be generated that includes two words: "ray" and "gamma." The bi-gram may be added to the corpus of words for the measurement types of the first entries.

The method 900 may also include modifying the description of the well log, as at 912. The description of the well log may be modified based at least partially upon the corpus of words from the measurement types in the first entries in the database. More particularly, the description of the well log may be modified by removing words from the description that are not in the corpus of words. For example, in Table 2 above, the words "PFC," "internal," and "curve" may be removed from the description of the well log because these words are not in the corpus of words. The words "gamma" and "ray" may remain in the description because they are in the corpus of words.

The method 900 may also include identifying one or more second entries in the database that at least partially match(es) the modified description of the well log, as at 914. More particularly, this may include identifying one or more second entries in the database whose family at least partially matches the modified description of the well log. For example, this may include identifying the first entries whose families have one or more n-grams that match the n-gram(s) of the modified description of the well log. The second entries may be or include a subset of the first entries. The order/sequence of the n-grams may not be taken into account.

If a single second entry is identified, the method 900 may include assigning the family of the single second entry to the well log, as at 916. If more than one second entry is identified, the method 900 may include identifying the second entry whose family has the most (e.g., highest number of) n-grams that match the n-gram(s) of the modified description of the well log, and assigning that second entry to the well log, as at 918.

An example of a portion of the database is shown in Table 3 below. Table 3 may be referred to as a family database or family dictionary. More particularly, Table 3 shows a plurality of second entries in the database, and each second entry may include a family and one or more words based upon the family. The names, units, and descriptions have been omitted from Table 3 for simplicity.

TABLE 3

| Family | Words | |
|--------|-------|---|
| Electric Potential | electric | potential |
| Tool Status | tool | status |
| Count Rate | count | rate |
| Quality Indicator | quality | indicator |
| Electric Current | electric | current |
| Gamma Ray | gamma | ray |
| Bulk Density | bulk | density |
| Tool Temperature | tool | temperature |

In an example, the family "gamma ray" from the Table 3 may be assigned to the well log in Table 1 (e.g., having name PFC) because the n-gram [gamma, ray] in Table 3 matches the n-gram [gamma, ray] in the modified description of the well log.

In at least one embodiment, the measurement type of the well log may be unable to be determined/assigned using the foregoing steps (e.g., because the well log may have no description, or no second entries may exist). If the measurement type of the well log is unable to be determined/assigned using the foregoing steps, the method 900 may also include identifying third entry in the database that has a name that is (e.g., most) similar to the name of the well log, as at 920. The similarity of the names may be determined using a metric distance such as Levenshtein distance. The method 900 may also include assigning the family of the third entry to the well log, as at 922. For example, the well log may include the information in Table 4 below.

TABLE 4

| Name | Unit | Description |
|------|------|-------------|
| SGR | GAPI | None |

In Table 4, the well log has no description, and thus no second entries exist. Thus, a third entry in the database may be identified that has a name that is most similar to the name of the well log (i.e., SGR). In one embodiment, the third entry may be a subset of the one or more first entries. In another embodiment, the third entry may not be a subset of the one or more first entries. In other words, the third entry may be identified/selected from the entire database (e.g., outside the one or more first entries). Table 5 below shows an example of a third entry having a name (i.e., GR) that is most similar to the name of the well log (i.e., SGR).

TABLE 5

| Name/Code | Description | Family | Unit |
| --- | --- | --- | --- |
| GR | Gamma Ray | Gamma Ray | gApi |

The Levenshtein distance between "SGR" and "GR" is 1. If this is the minimum distance between a name in the database and the name of the well log curve, then the well log may be assigned to family "Gamma Ray" from the third entry.

In at least one embodiment, the method 900 may also include performing a wellsite activity, as at 924. The wellsite activity may be based at least partially upon the well log, including the family assigned to the well log. The wellsite activity may be or include generating or updating a model. The model may be or include a model of the wellsite (e.g., including the subterranean formation 102 and/or the wellbore 136). The model may also or instead include the well log(s). The model may be updated to include the assigned measurement type. The wellsite activity may also or instead be or include planning a path/trajectory of the wellbore 136 in the subterranean formation 102. The wellsite activity may also or instead include modifying the path/trajectory of the wellbore 136 in the subterranean formation 102. The wellsite activity may also or instead include drilling the wellbore 136 in the subterranean formation 102 based at least partially upon the planned or modified path/trajectory. The wellsite activity may also or instead include varying the weight on the drill bit (WOB), the rate of penetration (ROP), the type of fluid pumped into the wellbore 136, the volumetric rate of fluid pumped into the wellbore 136, or a combination thereof.

FIGS. 10A-10C illustrate a flowchart of a method 1000, according to an embodiment. The method 1000 may include at least a portion of the method 400 and/or at least a portion of the method 900. An illustrative order of the method 1000 is provided below; however, one or more portions of the method 1000 may be performed in a different order, performed simultaneously (e.g., in parallel), repeated, or omitted. One or more portions of the method 1000 may be performed by the computing system 1100.

The method 1000 may include receiving a target well log having a name, a unit, and a description assigned thereto, as at 1005 (e.g., FIG. 9, 902).

The method 1000 may also include identifying a plurality of first entries in a database that have a unit and a measurement type assigned thereto, as at 1010 (e.g., FIG. 9, 908). The units of the first entries are compatible with the unit of the target well log.

The method 1000 may also include generating a corpus of words from the measurement types of the first entries, as at 1015 (e.g., FIG. 9, 910). In one embodiment, generating the corpus of words may include generating one or more n-grams based at least partially upon the measurement types of the first entries, as at 1016.

The method 1000 may also include modifying the description of the target well log based at least partially upon the corpus of words, as at 1020 (e.g., FIG. 9, 912). In one embodiment, modifying the description may include removing one or more words from the description of the target well log that are not in the corpus of words, as at 1021.

The method 1000 may also include identifying one or more second entries in the database having a measurement type assigned thereto that at least partially matches the modified description of the target well log, as at 1025 (e.g., FIG. 9, 914). In one embodiment, the one or more second entries may include a subset of the plurality of first entries, as at 1026. In one embodiment, the measurement type of the first entries includes one or more first n-grams, the modified description of the target well log includes one or more second n-grams, and identifying the one or more second entries includes identifying the one or more first n-grams that match the one or more second n-grams, as at 1027.

The method 1000 may also include assigning the measurement type of the one or more second entries to the target well log, as at 1030 (e.g., FIG. 9, 916, 918). In one embodiment, the one or more second entries may include a plurality of second entries, assigning the measurement type may include identifying a particular second entry whose measurement type has a highest number of first n-grams, and assigning the measurement type of the second entry to the well log, as at 1031.

The method 1000 may also include generating or updating a model to include the assigned measurement type, as at 1035 (e.g., FIG. 9, 924).

The method 1000 may also include determining a plurality of well signatures of a reference well marker in one of the one or more reference wells based at least partially upon a downhole measurement in the one or more reference wells, and determining whether the well signatures are consistent with one another using a clustering algorithm, as at 1050 (e.g., FIG. 4, 406). In one embodiment, the method 1000 may also include determining that the well signatures are inconsistent with one another based at least partially upon the well signatures being present in a first cluster and a second cluster, and determining that the first cluster is more accurate than the second cluster based at least partially upon the first cluster having a higher density of the well signatures than the second cluster, as at 1051 (e.g., FIG. 4, 408).

The method 1000 may also include determining a search window in the target well log, as at 1055 (e.g., FIG. 4, 412). In one embodiment, the one or more reference wells may include a first reference well boundary, a second reference well boundary, and a reference well marker, as at 1056. A predetermined confidence level exists that the reference well marker is positioned between the first and second reference well boundaries. Determining the search window in the target well may include determining a first target well boundary and a second target well boundary.

The predetermined confidence level exists that the target well marker is positioned between the first and second target well boundaries. A distance between the first and second reference well boundaries is less than a distance between the first and second target well boundaries.

The method 1000 may also include identifying one or more of the reference wells based at least partially upon the target well log, as at 1060 (e.g., FIG. 4, 414).

The method 1000 may also include predicting a plurality of locations of a target well marker in the target well log based at least partially upon the one or more reference wells, as at 1065 (e.g., FIG. 4, 416). The locations of the target well marker are within the search window. In one embodiment, predicting the locations of the target well marker may include predicting a first location of the target well marker based at least partially upon a first reference well marker in a first of the one or more reference wells, and predicting a second location of the target well marker based at least partially upon a second reference well marker in a second of the one or more reference wells, as at 1066. In another embodiment, predicting the locations of the target well marker may include predicting a first location of the target well marker using a first algorithm based at least partially upon a reference well marker in the one or more reference wells, and predicting a second location of the target well marker using a second algorithm based at least partially upon the reference well marker in the one or more reference wells, as at 1067. The first and second algorithms are different.

The method 1000 may also include determining similarity values for the locations of the target well marker, as at 1070 (e.g., FIG. 4, 418). The similarity values may be based upon two or more of the reference wells and two or more algorithms, as at 1071.

The method 1000 may also include assigning the target well marker to at least one of the locations based at least partially upon the similarity values, as at 1075 (e.g., FIG. 4, 424). For example, the target well marker may be assigned to one of the locations having the highest similarity value, as at 1076.

The method 1000 may also include generating or updating the model to include the assignment of the target well marker, as at 1080 (e.g., FIG. 4, 428).

Figure 11:
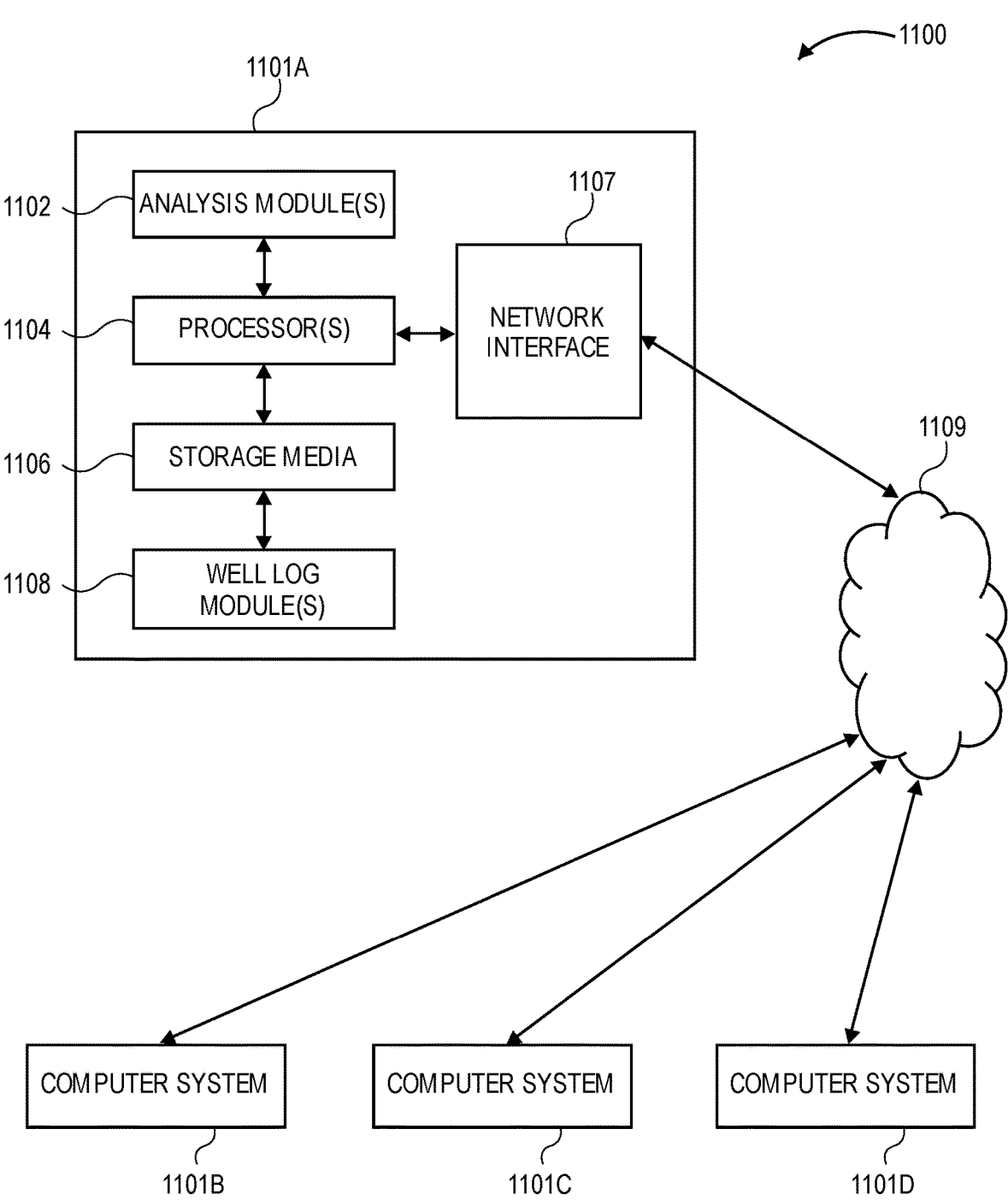
FIG. 11 illustrates a computing system for performing at least a portion of the method(s) disclosed herein, according to an embodiment.

In some embodiments, any of the methods of the present disclosure may be executed by a computing system. FIG. 11 illustrates an example of such a computing system 1100, in accordance with some embodiments. The computing system 1100 may include a computer or computer system 1101A, which may be an individual computer system 1101A or an arrangement of distributed computer systems. The computer system 1101A includes one or more analysis module(s) 1102 configured to perform various tasks according to some embodiments, such as one or more methods disclosed herein. To perform these various tasks, the analysis module 1102 executes independently, or in coordination with, one or more processors 1104, which is (or are) connected to one or more storage media 1106. The processor(s) 1104 is (or are) also connected to a network interface 1107 to allow the computer system 1101A to communicate over a data network 1109 with one or more additional computer systems and/or computing systems, such as 1101B, 1101C, and/or 1101D (note that computer systems 1101B, 1101C and/or 1101D may or may not share the same architecture as computer system 1101A, and may be located in different physical locations, e.g., computer systems 1101A and 1101B may be located in a processing facility, while in communication with one or more computer systems such as 1101C and/or 1101D that are located in one or more data centers, and/or located in varying countries on different continents).

A processor can include a microprocessor, microcontroller, processor module or subsystem, programmable integrated circuit, programmable gate array, or another control or computing device.

The storage media 1106 can be implemented as one or more computer-readable or machine-readable storage media. Note that while in the example embodiment of FIG. 11 storage media 1106 is depicted as within computer system 1101A, in some embodiments, storage media 1106 may be distributed within and/or across multiple internal and/or external enclosures of computing system 1101A and/or additional computing systems. Storage media 1106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 1100 contains one or more well log module(s) 1108 that may perform at least a portion of one or more of the method(s) 400, 900, 1000 described above. It should be appreciated that computing system 1100 is only one example of a computing system, and that computing system 1100 may have more or fewer components than shown, may combine additional components not depicted in the example embodiment of FIG. 11, and/or computing system 1100 may have a different configuration or arrangement of the components depicted in FIG. 11. The various components shown in FIG. 11 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Geologic interpretations, models and/or other interpretation aids may be refined in an iterative fashion; this concept is applicable to embodiments of the present methods discussed herein. This can include use of feedback loops executed on an algorithmic basis, such as at a computing device (e.g., computing system 1100, FIG. 11), and/or through manual control by a user who may make determinations regarding whether a given step, action, template, model, or set of curves has become sufficiently accurate for the evaluation of the subterranean three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
   receiving a target well log having a name, a unit, and a description assigned thereto;
   identifying a plurality of first entries in a database that have a unit and a measurement type assigned thereto, wherein the units of the plurality of first entries are compatible with the unit of the target well log, and wherein the measurement type of the plurality of first entries comprises one or more first n-grams;

generating a corpus of words from the measurement types of the plurality of first entries;

modifying the description of the target well log based at least partially upon the corpus of words, wherein the modified description of the target well log comprises one or more second n-grams;

identifying one or more second entries in the database having a measurement type assigned thereto that at least partially matches the modified description of the target well log, wherein identifying the one or more second entries comprises identifying the one or more first n-grams that match the one or more second n-grams;

assigning the measurement type of the one or more second entries to the target well log;

determining a search window in the target well log;

identifying one or more reference wells based at least partially upon the target well log;

predicting a plurality of locations of a target well marker in the target well log based at least partially upon the one or more reference wells, wherein the plurality of locations of the target well marker are within the search window;

determining similarity values for the plurality of locations of the target well marker;

automatically assigning the target well marker to at least one of the plurality of locations based at least partially upon the similarity values; and automatically performing a wellsite activity based on the target well log, wherein the wellsite activity is at least one of:

modifying a trajectory of a wellbore;

drilling the wellbore in a subterranean formation based at least partially on the modified trajectory;

varying a weight on the drill bit (WOB);

varying a rate of penetration (ROP);

varying a type of fluid pumped into the wellbore;

varying a volumetric rate of fluid pumped into the wellbore; or a combination thereof.

2. The method of claim 1, wherein predicting the plurality of locations of the target well marker comprises:

predicting a first location of the target well marker based at least partially upon a first reference well marker in a first of the one or more reference wells; and predicting a second location of the target well marker based at least partially upon a second reference well marker in a second of the one or more reference wells.

3. The method of claim 1, further comprising generating or updating a model to include the assignment of the target well marker.

4. A method, comprising:

determining a search window in a target well, wherein determining the search window in the target well comprises determining a first target well boundary and a second target well boundary;

identifying one or more reference wells based at least partially upon a location of the target well, wherein the one or more reference wells comprise a first reference well boundary, a second reference well boundary, and a reference well marker, wherein a predetermined confidence level exists that a reference well marker is positioned between the first reference well boundary and the second reference well boundary, and wherein a distance between the first and second reference well boundaries is less than a distance between the first target well boundary and the second target well boundary;

predicting a plurality of locations of a target well marker in the target well based at least partially upon the one or more reference wells, wherein the locations of the target well marker are within the search window, wherein the predetermined confidence level exists that the target well marker is positioned between the first target well boundary and the second target well boundary;

determining similarity values for the locations of the target well marker;

automatically assigning the target well marker to at least one of the plurality of locations based at least partially upon the similarity values; and automatically controlling a wellsite activity based on the target well marker, wherein the wellsite activity is at least one of:

modifying a trajectory of a wellbore;

drilling the wellbore in a subterranean formation based at least partially on the modified trajectory;

varying a weight on the drill bit (WOB);

varying a rate of penetration (ROP);

varying a type of fluid pumped into the wellbore;

varying a volumetric rate of fluid pumped into the wellbore; or a combination thereof.

5. The method of claim 4, further comprising:

determining a plurality of well signatures of the reference well marker in one of the one or more reference wells based at least partially upon a downhole measurement in the one or more reference wells; and determining whether the well signatures are consistent with one another using a clustering algorithm.

6. The method of claim 5, wherein determining whether the plurality of well signatures are consistent with one another comprises determining that the plurality of well signatures are inconsistent with one another based at least partially upon the well signatures being present in a first cluster and a second cluster, the method further comprising determining that the first cluster is more accurate than the second cluster based at least partially upon the first cluster having a higher density of the well signatures than the second cluster.

7. The method of claim 4, wherein predicting the plurality of locations of the target well marker comprises:

predicting a first location of the target well marker based at least partially upon a first reference well marker in a first of the one or more reference wells; and predicting a second location of the target well marker based at least partially upon a second reference well marker in a second of the one or more reference wells.

8. The method of claim 4, wherein predicting the plurality of locations of the target well marker comprises:

predicting a first location of the target well marker using a first algorithm based at least partially upon the reference well marker in the one or more reference wells; and predicting a second location of the target well marker using a second algorithm based at least partially upon the reference well marker in the one or more reference wells, wherein the first algorithm and the second algorithm are different.

9. The method of claim 4, wherein the similarity values for the plurality of locations of the target well marker are determined based upon at least two of the one or more reference wells and at least two different algorithms.

10. The method of claim 4, wherein the target well marker is assigned to one of the plurality of locations having the highest similarity value.

11. The method of claim 4, further comprising generating or updating a model to include the assignment of the target well marker.

12. The method of claim 4, wherein the target well has a unit and a description assigned thereto, wherein the target well does not have a measurement type assigned thereto, and wherein the method further comprises:

identifying a plurality of first entries in a database, wherein the plurality of first entries have a unit and a measurement type assigned thereto, and wherein the units of the first entries are compatible with the unit of the target well;

generating a corpus of words from the measurement types of the first entries;

modifying the description of the target well based at least partially upon the corpus of words;

identifying one or more second entries in the database, wherein the one or more second entries have a measurement type assigned thereto, wherein the measurement type of the one or more second entries at least partially matches the modified description of the target well; and assigning the measurement type of the one or more second entries to the target well.

13. A method, comprising:

receiving a target well log having a unit and a description assigned thereto;

identifying a plurality of first entries in a database that have a unit and a measurement type assigned thereto, wherein the units of the plurality of first entries are compatible with the unit of the target well log;

generating a corpus of words based on the measurement types of the first entries, wherein generating the corpus of words comprises generating one or more n-grams based at least partially upon the measurement types of the first entries;

modifying the description of the target well log based at least partially upon the corpus of words;

identifying one or more second entries in the database having a measurement type assigned thereto that at least partially matches the modified description of the target well log;

automatically assigning the measurement type of the one or more second entries to the target well log; and automatically performing a wellsite activity based on the target well log, wherein the wellsite activity is at least one of:

modifying a trajectory of a wellbore;

drilling the wellbore in a subterranean formation based at least partially on the modified trajectory;

varying a weight on the drill bit (WOB);

varying a rate of penetration (ROP);

varying a type of fluid pumped into the wellbore;

varying a volumetric rate of fluid pumped into the wellbore; or a combination thereof.

14. The method of claim 13, wherein modifying the description of the target well log comprises removing one or more words from the description of the target well log that are not in the corpus of words.

15. The method of claim 13, wherein the one or more second entries comprise a subset of the plurality of first entries.

16. The method of claim 13, wherein the measurement type of the plurality of first entries comprises one or more first n-grams, wherein the modified description of the target well log comprises one or more second n-grams, and wherein identifying the one or more second entries comprises identifying the one or more first n-grams that match the one or more second n-grams.

17. The method of claim 16, wherein the one or more second entries comprise a plurality of second entries, and wherein assigning the measurement type comprises:

identifying a particular second entry whose measurement type has a highest number of the one or more first n-grams that match the one or more second n-grams; and assigning the measurement type of the particular second entry to the target well log.

18. The method of claim 13, further comprising generating or updating a model to include the assigned measurement type.

19. The method of claim 13, further comprising:

determining a search window in the target well log;

identifying one or more reference wells based at least partially upon the target well log;

predicting a plurality of locations of a target well marker in the target well log based at least partially upon the one or more reference wells, wherein the plurality of locations of the target well marker are within the search window;

determining similarity values for the locations of the target well marker; and assigning the target well marker to at least one of the locations based at least partially upon the similarity values.

* * * * *